US012335738B2

(12) United States Patent
Eriksson

(10) Patent No.: US 12,335,738 B2
(45) Date of Patent: Jun. 17, 2025

(54) SYSTEM AND METHOD FOR REAL-TIME APPLICATIONS OVER WIRELESS NETWORKS

(71) Applicant: UXSTREAM AB, Stockholm (SE)

(72) Inventor: Thomas Eriksson, Tynningö (SE)

(73) Assignee: UXStream AB, Stockholm (SE)

( * ) Notice: Subject to any disclaimer, the term of this patent is extended or adjusted under 35 U.S.C. 154(b) by 0 days.

(21) Appl. No.: 18/880,251

(22) PCT Filed: May 14, 2024

(86) PCT No.: PCT/SE2024/050467
§ 371 (c)(1),
(2) Date: Dec. 30, 2024

(87) PCT Pub. No.: WO2024/242607
PCT Pub. Date: Nov. 28, 2024

(65) Prior Publication Data
US 2025/0168644 A1    May 22, 2025

Related U.S. Application Data

(60) Provisional application No. 63/635,053, filed on Apr. 17, 2024, provisional application No. 63/467,966, filed on May 21, 2023.

(51) Int. Cl.
*H04W 12/37* (2021.01)
*H04W 12/122* (2021.01)
*H04W 12/33* (2021.01)

(52) U.S. Cl.
CPC ......... *H04W 12/37* (2021.01); *H04W 12/122* (2021.01); *H04W 12/33* (2021.01)

(58) Field of Classification Search
CPC .... H04W 12/37; H04W 12/122; H04W 12/33
See application file for complete search history.

(56) References Cited

U.S. PATENT DOCUMENTS

| 7,636,499 B1 | 12/2009 | Arant et al. |
| 7,730,157 B2 | 6/2010 | Baratto et al. |

(Continued)

FOREIGN PATENT DOCUMENTS

| WO | WO2011031373 A2 | 3/2011 |
| WO | WO2012109078 A2 | 8/2012 |

(Continued)

OTHER PUBLICATIONS

Sridhar et al., "Adaptive Display Virtualization and Dataflow Model Selection (ADVADAMS) for reducing Interaction Latency in Thin Clients", Apr. 2012, International Conference on Recent Trends in Information Technology, pp. 233-238 (Year: 2012).*

(Continued)

*Primary Examiner* — Kenneth W Chang

(57) ABSTRACT

A client-server architecture for providing interactive dumb terminal applications to a plurality of portable electronic devices, including provide a server running an operating system, configure a display timing parameter for the operating system, connect the server with portable electronic devices over a wireless communication system, wherein the server continually monitors bandwidth of each communicative connection, run, by the server, applications in parallel, each application run on behalf of a corresponding one of the devices, each application configured to generate output in accordance with the display timing parameter, run, by the server, an edge application, to select data from the outputs and transmit the selected data to respective ones of the connected devices over the wireless communication system, wherein a frequency of transmission to each device is dynamically throttled up or down by the edge application in accordance with changes in the monitored bandwidth of the connection to that device.

42 Claims, 25 Drawing Sheets

(56) References Cited

U.S. PATENT DOCUMENTS

| | | |
|---|---|---|
| 8,169,436 B2 | 5/2012 | Rivera et al. |
| 8,266,232 B2 | 9/2012 | Piper et al. |
| 8,611,362 B2 | 12/2013 | Chen et al. |
| 8,638,337 B2 | 1/2014 | Tung et al. |
| 8,755,846 B2 | 6/2014 | Moran et al. |
| 8,933,892 B2 | 1/2015 | Woolley et al. |
| 8,947,353 B2 | 2/2015 | Boulanger et al. |
| 9,511,288 B2 | 12/2016 | Pereira et al. |
| 9,656,160 B2 | 5/2017 | Perry et al. |
| 9,866,785 B2 | 1/2018 | Strasser et al. |
| 10,057,349 B2 | 8/2018 | Kodner et al. |
| 10,555,045 B2 | 2/2020 | Shaw et al. |
| 10,583,366 B2 | 3/2020 | Cotter |
| 10,701,118 B2 | 6/2020 | Brelivet |
| 10,733,005 B1 | 8/2020 | Zelenov et al. |
| 10,832,057 B2 | 11/2020 | Chan et al. |
| 10,951,890 B1 | 3/2021 | Dickson et al. |
| 11,079,929 B2 | 8/2021 | Walkin et al. |
| 11,298,614 B2 | 4/2022 | Posin |
| 11,381,880 B2 | 7/2022 | Bayer et al. |
| 11,546,397 B2 | 1/2023 | Dvir et al. |
| 11,563,993 B2 | 1/2023 | Gordon et al. |
| 11,590,419 B2 | 2/2023 | Perry et al. |
| 11,671,835 B2 | 6/2023 | Hawkins et al. |
| 11,716,246 B2 | 8/2023 | Lee et al. |
| 2005/0157646 A1* | 7/2005 | Addagatla ............... H04L 47/12 370/232 |
| 2006/0206820 A1 | 9/2006 | Bullard et al. |
| 2006/0233108 A1* | 10/2006 | Krishnan ............. H04J 3/1682 370/235 |
| 2007/0265857 A1 | 11/2007 | Shivaji Rao |
| 2008/0205270 A1 | 8/2008 | Kasheff et al. |
| 2009/0115905 A1 | 5/2009 | Estrop et al. |
| 2010/0011012 A1 | 1/2010 | Rawson |
| 2011/0004831 A1 | 1/2011 | Steinberg et al. |
| 2011/0078532 A1 | 3/2011 | Vonog et al. |
| 2011/0173663 A1 | 7/2011 | Boudalier |
| 2011/0246665 A1* | 10/2011 | Vange ..................... H04L 9/40 709/233 |
| 2013/0012160 A1* | 1/2013 | Rubin ..................... H04L 47/20 455/406 |
| 2013/0013671 A1 | 1/2013 | Relan et al. |
| 2013/0023232 A1* | 1/2013 | Mendiola .............. H04M 15/70 455/406 |
| 2013/0198275 A1 | 8/2013 | Forsblom |
| 2013/0273853 A1 | 10/2013 | Reed et al. |
| 2014/0096165 A1 | 4/2014 | Bei et al. |
| 2014/0183342 A1 | 7/2014 | Shedletsky et al. |
| 2014/0379910 A1* | 12/2014 | Saxena .................. H04L 47/72 709/225 |
| 2015/0142830 A1 | 5/2015 | Klawitter et al. |
| 2015/0334101 A1 | 11/2015 | Brüchner et al. |
| 2016/0027143 A1 | 1/2016 | Amidei et al. |
| 2016/0110030 A1 | 4/2016 | Bohi |
| 2016/0292812 A1 | 10/2016 | Wu et al. |
| 2017/0060242 A1 | 3/2017 | Gill et al. |
| 2018/0183855 A1 | 6/2018 | Sabella et al. |
| 2018/0276621 A1 | 9/2018 | Madejczyk et al. |
| 2018/0302370 A1 | 10/2018 | Nakahara et al. |
| 2020/0051309 A1 | 2/2020 | Labbe et al. |
| 2020/0186857 A1 | 6/2020 | Easley et al. |
| 2020/0193858 A1 | 6/2020 | Bulut et al. |
| 2020/0294179 A1 | 9/2020 | Ray et al. |
| 2021/0232527 A1 | 7/2021 | Sweet, Jr. |
| 2021/0314744 A1 | 10/2021 | Files et al. |

FOREIGN PATENT DOCUMENTS

| | | |
|---|---|---|
| WO | WO2016054699 A1 | 4/2016 |
| WO | WO2017161361 A2 | 9/2017 |
| WO | WO2019178470 A1 | 9/2019 |

OTHER PUBLICATIONS

Deboosere et al., "Cloud-Based Desktop Services for Thin Clients", Oct. 2011, IEEE Internet Computing, vol. 16, No. 6, pp. 60-67 (Year: 2011).*

Bhojan Anand and Pan Wenren. 2017. CloudHide: Towards Latency Hiding Techniques for Thin-client Cloud Gaming. In Proceedings of the on Thematic Workshops of ACM Multimedia 2017 (Thematic Workshops '17). Association for Computing Machinery, New York, NY, USA, 144-152. https://doi.org/10.1145/3126686.3126777. 10 pages.

H. G. Schantz, "Introduction to ultra-wideband antennas," IEEE Conference on Ultra Wideband Systems and Technologies, 2003, Reston, VA, USA, 2003, pp. 1-9, doi: 10.1109/UWBST.2003.1267792. 10 pages.

USPTO Office Action, U.S. Appl. No. 16/045,975, mailed on Jun. 1, 2020, 11 pages.

3GPP TS 23.222 V16.9.0 (Oct. 2020), 117 pages.

3GPP TS 23.401 V15.4.0 (Jul. 2018), 412 pages.

3GPP TS 23.501 V16.6.0 (Oct. 2020), 450 pages.

3GPP TS 23.558 V17.3.0 (May 2022), 170 pages.

3GPP TS 28.538 V17.0.0 (May 2022), 57 pages.

3GPP TS 123.558 V17.4.0 (Jul. 2022), 171 pages.

ETSI White Paper Network Transformation 2019 N32, ETSI 3rd Generation Partnership Project (3GPP), 2019, 16 pages.

PCT Written Opinion of the International Search Authority for PCT App. No. PCT/SE2024/050467, mailed on Jun. 5, 2024, 5 pages.

G. Paravati, C. Celozzi, A. Sanna and F. Lamberti, "A feedback-based control technique for interactive live streaming systems to mobile devices," in IEEE Transactions on Consumer Electronics, vol. 56, No. 1, pp. 190-197, Feb. 2010, doi: 10.1109/TCE.2010.5439144. 8 pages.

Bhojan, Anand & Wenren, Pan, CloudHide: Towards Latency Hiding Techniques for Thin-client Cloud Gaming, Thematic Workshops '17: Proceedings of the on Thematic Workshops of ACM Multimedia 2017, Oct. 23, 2017, pp. 144-152, https://doi.org/10.1145/3126686.3126777, Association for Computing Machinery, New York, NY, USA. 10 pages.

H. G. Schantz, "Introduction to ultra-wideband antennas," IEEE Conference on Ultra Wideband Systems and Technologies, 2003, Reston, VA, USA, Nov. 16-19, 2003, pp. 1-9, doi: 10.1109/UWBST.2003.1267792, IEEE. 10 pages.

3GPP TS 23.222 V16.9.0 (Oct. 2020), 2020, ETSI, France. 117 pages.

3GPP TS 23.401 V15.4.0 (Jul. 2018), 2018, , ETSI, France. 412 pages.

3GPP TS 23.501 V16.6.0 (Oct. 2020), 2020, ETSI, France. 450 pages.

3GPP TS 23.558 V17.3.0 (May 2022), 2022, ETSI, France. 170 pages.

3GPP TS 28.538 V17.0.0 (May 2022), 2022, ETSI, France. 57 pages.

3GPP TS 123.558 V17.4.0 (Jul. 2022), 2022, ETSI, France. 171 pages.

ETSI White Paper Network Transformation 2019 N32, ETSI 3rd Generation Partnership Project (3GPP), 2019, ETSI, France. 16 pages.

* cited by examiner

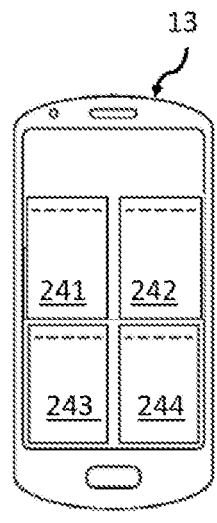
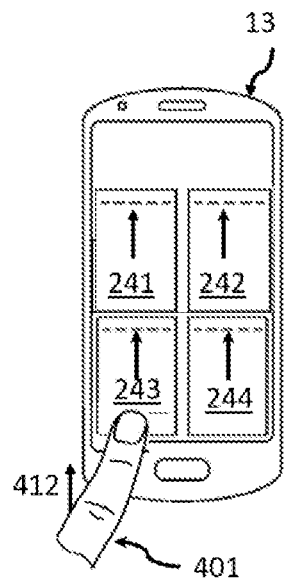
FIG. 25　　　　FIG. 26
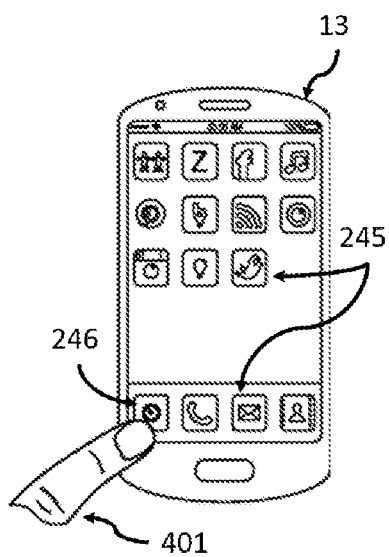
FIG. 27

SYSTEM AND METHOD FOR REAL-TIME APPLICATIONS OVER WIRELESS NETWORKS

FIELD OF THE INVENTION

The field of the present invention is mobile devices that operate as dumb terminals, interfacing with a server-based environment that runs real-time applications for the mobile devices.

BACKGROUND OF THE INVENTION

An important feature for applications delivered via a network is the ability to run the application immediately when requested by the user, with minimal delays for installation or buffering. Different approaches exist for delivering applications over a network.

According to one approach, a client system is modified to appear as if a program was installed, or to actually install the software itself, and then backout these modifications to restore the original client configuration. In doing this, multiple problems present themselves: conflicts between an application and the client computer current configuration, multiple instances of the same or different applications, complexity of the backout process requires a process to ensure all modifications have been restored, and the use of shared files and system components by multiple applications complicates both the installation process and the backout process.

According to another approach, a server runs an application and intercepts the drawing commands at the device layer, sending these commands as a script to be rendered by a client. In order to support all types of applications, the full range of drawing commands needs to be supported by the client. In addition, in order to support social media applications, a real time video decoder is required for playing video content. Many smart devices, such as smartwatches, cannot accommodate the graphics hardware necessary to execute these instructions in real time, whereas larger devices, such as mobile phones and tablets, that include additional video and graphics hardware, become more expensive as a result.

According to yet another approach, a video stream is encoded offline and steamed to multiple devices at different resolutions, different frame rates, and different compression rates. Video streaming is suitable for applications that deliver pre-recorded content, such as television shows and movies, but not for real-time, desktop or application streaming, as each time the desktop or application changes, a new video stream needs to be created and buffered, causing repeated lags that disrupt the user experience. For instance, 3-5 frames are buffered prior to encoding B-frames in video encoders such as H.264 and H.265.

In the prior art, in order for a server to run applications for a plurality of devices, the server computer runs a virtual machine for each connected device, respectively. Server processing resources such as CPU cycles are allocated to the different virtual machines and it is difficult to dynamically reallocate resources among the different virtual machines based on changing real-time processing requirements by the different virtual machines.

SUMMARY

There is thus provided in accordance with an embodiment of the present invention, a client-server architecture for providing interactive dumb terminal applications through a wireless communication system to a plurality of portable electronic devices, including provide a server computer running an operating system, configure a display timing parameter for the operating system, communicatively connect the provided server computer with a plurality of portable electronic devices over a wireless communication system, each device including a wireless transceiver and operable to decompress incoming compressed data streamed via the wireless communication system, wherein the provided server computer continually monitors bandwidth of each communicative connection to each of the devices, run, by the server computer, a plurality of applications in parallel, each application being run on behalf of a corresponding one of the connected devices, each application being configured to generate output in accordance with the configured display timing parameter, run, by the server computer, an edge application, configured to select data from the application outputs and to selectively transmit the selected data in a compressed format to respective ones of the connected devices over the wireless communication system, wherein a frequency of transmission to each device is dynamically throttled up or down by the edge application in accordance with changes in the monitored bandwidth of the communicative connection to that device, and decompress the selected data, by each connected device to which selected data was transmitted.

According to further features in embodiments of the invention, the outputs generated by the plurality of applications are bitmaps, and each of the connected devices further includes a display and is further operable to render its decompressed bitmaps on its display.

According to further features in embodiments of the invention, the edge application is configured to identify sponsored content in the bitmaps selected from the application outputs and to selectively remove the identified sponsored content prior to selectively transmitting the selected bitmaps in a compressed format to respective ones of the connected devices.

According to further features in embodiments of the invention, the edge application replaces the identified sponsored content with other content prior to selectively transmitting the selected bitmaps in a compressed format to respective ones of the connected devices.

According to further features in embodiments of the invention, the plurality of applications include multiple applications running on behalf of each of the connected devices, and wherein sponsored content identified in output from one application is replaced with output from another application running on behalf of the same connected device.

According to further features in embodiments of the invention, the edge application is configured to perform optical character recognition (OCR) on the bitmaps selected from the application outputs.

According to further features in embodiments of the invention, the configured operating system display timing parameter is less than or equal to half the display timing for the displays on each of the connected devices in order that the running applications generate output at a rate that is at least twice the refresh rate of each of the connected device displays.

According to further features in embodiments of the invention, the connected devices are electronic watches and mobile phones.

According to further features in embodiments of the invention, the plurality of applications include two or more applications running on behalf of a single one of the connected devices.

According to further features in embodiments of the invention, the edge application combines outputs from the two or more applications and transmits the combined output in a compressed format to the single one of the connected devices over the wireless communication system.

According to further features in embodiments of the invention, the single one of the connected devices further includes at least one sensor operable to generate input, and is further operable to transmit the generated input to the edge application over the wireless communication system, wherein the edge application selects one of the two or more applications as an active application for the single one of the connected devices and transmits output data from the active application in a compressed format to the single one of the connected devices over the wireless communication system, and in response to certain input received from the single one of the connected devices the edge application selects a different one of the two or more applications as the active application for the single one of the connected devices.

According to further features in embodiments of the invention, the at least one sensor is a touchscreen and the certain input is a directional swipe gesture performed entirely inside an area of the touchscreen on which the active application is presented.

According to further features in embodiments of the invention, the at least one sensor is a proximity sensor and the certain input is an in-air directional swipe gesture above and across the display.

According to further features in embodiments of the invention, each of the connected devices further includes at least one sensor operable to generate input, and is further operable to transmit the generated input to the edge application over the wireless communication system, and the edge application directs the input from each device to its corresponding application.

According to further features in embodiments of the invention, the edge application validates inputs received over the wireless communication system to prevent invalid and malicious input from reaching the plurality of applications.

According to further features in embodiments of the invention, the edge application translates the input from each device in accordance with a command dictionary configured for each application-device pair including the device that generated the input and the application whose output was sent to that device.

According to further features in embodiments of the invention, the at least one sensor is a camera, and wherein the edge application analyzes images captured by the camera to prevent illegal images from reaching the plurality of applications.

According to further features in embodiments of the invention, each of the connected devices further includes at least one actuatable component, the plurality of applications generate actuator commands for the actuatable components in their corresponding connected devices, the edge application translates each actuator command in accordance with an actuator command dictionary configured for each application-device pair including the application generating the actuator command and its corresponding connected device and transmits the translated actuator command to its respective connected device over the wireless communication system.

According to further features in embodiments of the invention, the architecture further includes communicatively connect the provided server computer with a database storing an inventory of portable electronic devices, the inventory including, for each portable electronic device, a device identification number and a corresponding list of authorized applications for that device, wherein, when an inventoried portable electronic device communicatively connects to the provided computer server, the provided computer server runs all of the applications authorized for that device in accordance with the inventory.

According to further features in embodiments of the invention, the provided computer server continues to run all of the applications authorized for a portable electronic device included in the inventory after that device is no longer communicatively connected to the provided computer server, in order to resume the authorized applications quickly when that device reconnects to the provided computer server.

According to further features in embodiments of the invention, the provided computer server is configured to selectively run each of the plurality of applications in active mode when data from the application is transmitted to its corresponding connected device, and in idle mode when data from the application is not transmitted to its corresponding connected device, wherein an application running in idle mode utilizes fewer server computer resources than in active mode.

There is thus further provided in accordance with an embodiment of the present invention, a server computer for providing interactive dumb terminal applications through a wireless communication system to a plurality of portable electronic devices, including a wireless transceiver operable to communicatively connect with a plurality of portable electronic devices over a wireless communication system, a processor connected to the wireless transceiver, running an operating system having a configured display timing parameter and running a plurality of device applications in parallel, each device application being run on behalf of a corresponding one of the connected devices, each device application being configured to generate output in accordance with the configured display timing parameter, wherein the processor continually monitors bandwidth of each communicative connection to each of the devices, a first non-transitory storage medium storing instructions that, when run by the processor cause the processor to run an edge application configured to select data from the device application outputs and to selectively transmit the selected data in a compressed format to respective ones of the connected devices over the wireless communication system, wherein a frequency of transmission to each device is dynamically throttled up or down by the edge application in accordance with changes in the monitored bandwidth of the communicative connection to that device.

According to further features in embodiments of the invention, the outputs generated by the plurality of device applications are bitmaps, and wherein the edge application is configured to identify sponsored content in the bitmaps selected from the device application outputs and to selectively remove the identified sponsored content prior to selectively transmitting the selected bitmaps in a compressed format to respective ones of the connected devices.

According to further features in embodiments of the invention, the edge application replaces the identified sponsored content with other content prior to selectively transmitting the selected bitmaps in a compressed format to respective ones of the connected devices.

According to further features in embodiments of the invention, the plurality of device applications include multiple applications running on behalf of each of the connected devices, and wherein sponsored content identified in output from one application is replaced with output from another device application running on behalf of the same connected device.

According to further features in embodiments of the invention, the plurality of device applications include multiple social media applications running on behalf of each of the connected devices, wherein the outputs generated by the social media applications are bitmaps, and wherein the edge application is configured to receive, from each connected device, respective search criteria, to identify content in the bitmap outputs from the social media applications running on behalf of each of the connected devices that match the search criteria received from that device, to selectively combine the identified content from the multiple social media applications into a bitmap for the corresponding device.

According to further features in embodiments of the invention, the outputs generated by the plurality of device applications are bitmaps, and the edge application is configured to perform optical character recognition (OCR) on the bitmaps selected from the application outputs.

According to further features in embodiments of the invention, the configured operating system display timing parameter is less than or equal to half of a display timing for displays on each of the connected devices in order that the running device applications generate output at a rate that is at least twice the refresh rate of each of the connected device displays.

According to further features in embodiments of the invention, the connected devices are electronic watches and mobile phones.

According to further features in embodiments of the invention, the plurality of device applications include two or more applications running on behalf of a single one of the connected devices.

According to further features in embodiments of the invention, the edge application combines outputs from the two or more device applications and transmits the combined output in a compressed format to the single one of the connected devices over the wireless communication system.

According to further features in embodiments of the invention, the single one of the connected devices further includes at least one sensor operable to generate input, and is further operable to transmit the generated input to the edge application over the wireless communication system, the edge application selects one of the two or more device applications as an active application for the single one of the connected devices and transmits output data from the active application in a compressed format to the single one of the connected devices over the wireless communication system, and in response to certain input received from the single one of the connected devices the edge application selects a different one of the two or more device applications as the active application for the single one of the connected devices.

According to further features in embodiments of the invention, the at least one sensor is a touchscreen and the certain input is a directional swipe gesture performed entirely inside an area of the touchscreen on which the active application is presented.

According to further features in embodiments of the invention, the at least one sensor is a proximity sensor and the certain input is an in-air directional swipe gesture above and across the device display.

According to further features in embodiments of the invention, each of the connected devices is operable to generate sensor input and to transmit the sensor input to the edge application over the wireless communication system, and the edge application directs the sensor input from each device to its corresponding device application.

According to further features in embodiments of the invention, the edge application validates inputs received over the wireless communication system to prevent invalid and malicious input from reaching the plurality of device applications.

According to further features in embodiments of the invention, the edge application translates the input from each device in accordance with a command dictionary configured for each application-device pair including the device that generated the input and the device application whose output was sent to that device.

According to further features in embodiments of the invention, the at least one sensor is a camera, and the edge application analyzes images captured by the camera to prevent illegal images from reaching the plurality of device applications.

According to further features in embodiments of the invention, each of the connected devices further includes at least one actuatable component, the plurality of device applications generate actuator commands for the actuatable components in their corresponding connected devices, the edge application translates each actuator command in accordance with an actuator command dictionary configured for each application-device pair including the device application generating the actuator command and its corresponding connected device and transmits the translated actuator command to its respective connected device over the wireless communication system.

According to further features in embodiments of the invention, the server computer further includes a second non-transitory storage medium, connected to the processor, storing an inventory of portable electronic devices, the inventory including, for each portable electronic device, a device identification number and a corresponding list of authorized applications for that device, wherein, when an inventoried portable electronic device communicatively connects to the processor, the processor runs all of the applications authorized for that device in accordance with the inventory.

According to further features in embodiments of the invention, the first non-transitory storage medium stores additional instructions that, when read by the processor, cause the edge application to run all of the applications authorized for a portable electronic device included in the inventory after that device is no longer communicatively connected to the processor, in order to resume the authorized applications quickly when that device reconnects to the processor.

According to further features in embodiments of the invention, the first non-transitory storage medium stores additional instructions that, when read by the processor, cause the edge application to selectively run each of the plurality of device applications in active mode when data from the application is transmitted to its corresponding connected device, and in idle mode when data from the application is not transmitted to its corresponding connected device, wherein a device application running in idle mode utilizes fewer server computer resources than in active mode.

BRIEF DESCRIPTION OF THE DRAWINGS

The present invention will be more fully understood and appreciated from the following detailed description, taken in conjunction with the drawings in which:

FIGS. 25-29 are simplified illustrations of user interfaces and associated gestures for a dumb terminal client device, in accordance with an embodiment of the present invention;

In the disclosure and figures, the following numbering scheme is used. Like numbered elements are similar but not necessarily identical.

TABLE I

Elements of Figures

| Element | Numbering range | FIGS. |
|---|---|---|
| Network | 10, 11, 116, 119, 126, 129, 615, 632-634 | 1, 3-6, 14-16 |
| Network equipment | 17-19 | 1, 6 |
| Network communication | 112, 114, 122, 124, 131-133, 135, 136, 616-619, 625, 626, 627-630, 742-746, 1001, 1020-1032, 1034, 1035 | 3, 4-6, 9, 10, 14-16 |
| Server | 20, 21, 115, 118, 119, 125, 127, 128, 141, 142 | 1, 3, 4-6, 9-11 |
| Server equipment | 171-173, 501, 502, 791 | 7, 13, 22, 23, 24 |
| Server process | 117, 160-167, 201, 205-212, 219-223, 225-234, 235-240, 250-252, 260, 301-309, 311, 321-324, 331-334, 601-607, 701-709, 1015, 1017, 1018, 1019, 1033 | 6-16, 18 |
| Client-server computing capability | 101-105 | 2 |
| API | 270, 271 | 5 |
| Client device | 12-16, 110, 120, 341-344, 799 | 1, 3, 4, 6, 8, 11, 12, 22, 25-32, 35-37 |
| Device equipment | 280, 800-802, 820 | 21, 33, 34 |
| Client process | 111, 113, 121, 123, 610-613, 631, 720-724, 730-733, 1002, 1003, 1011, 1013, | 3, 4, 6, 9, 10, 14-16, 19, 20 |

TABLE I-continued

Elements of Figures

| Element | Numbering range | FIGS. |
| --- | --- | --- |
| Data | 140, 151-154, 241-244, 247, 281-287, 290-292, 295-298, 421-424, 650, 651, 655-658, 660-670, 675, 676, 750-755, 760-764, 770-774, 780, 790, 792, 793, 795, 796, 803, 805, 807, 815-818 | 6, 13, 17, 21-26, 33-39 |
| Time | 1000, 614 | 9, 10, 14 |
| User interface control | 245, 246, 261-263 | 27, 20-32 |
| Digit | 401, 402 | 26-29, 31, 32 |
| Gesture | 410-412 | 26, 28, 29 |

DETAILED DESCRIPTION

The present invention provides client-server architectures that enable interactive, dumb terminal applications through wireless communication systems to a plurality of portable electronic devices, addressing the conflicting needs for reduced latency and reduced system cost. The present invention ensures that any real-time application running on a server computer is compatible with a wide range of client devices by adapting and reconfiguring application inputs and outputs for the target device. Embodiments of the present invention deliver customized user experiences beyond the limited set of possibilities inherent in each application by processing application outputs and combining outputs from multiple applications prior to sending output to a client device over a wireless network.

Figure 1:
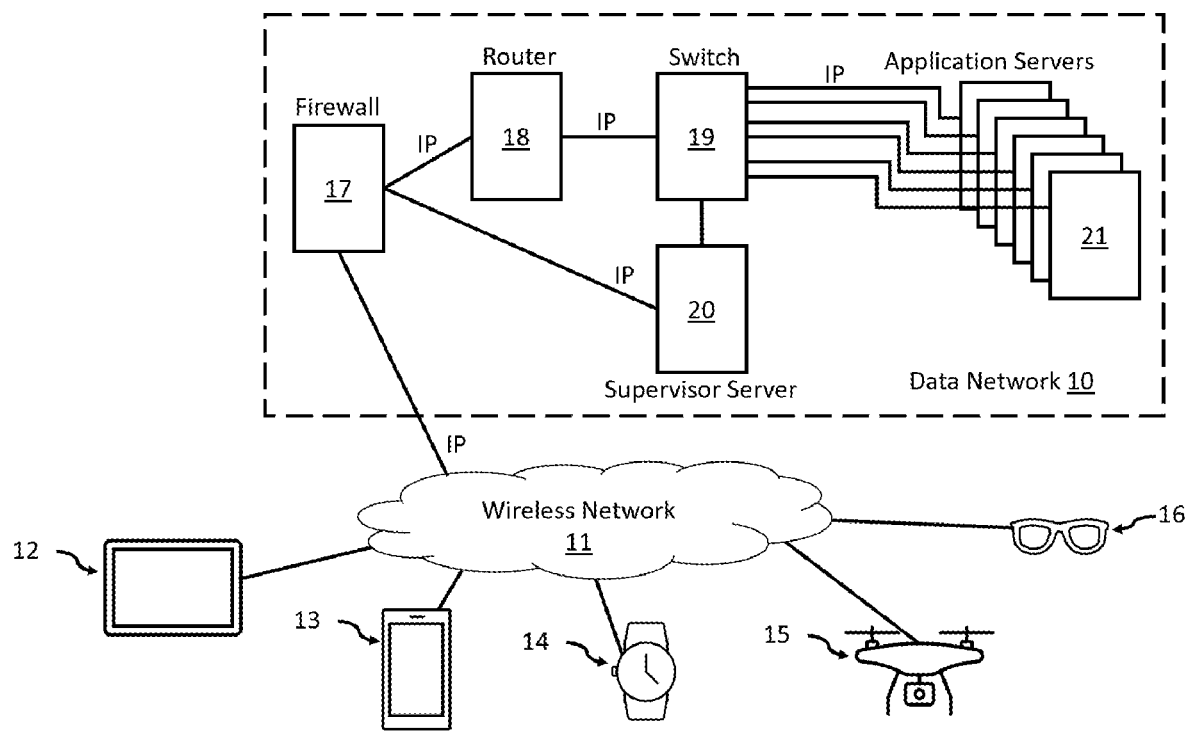
FIG. 1 is a simplified illustration of a system for delivering real-time applications running in a server-based environment to a range of portable electronic devices, in accordance with an embodiment of the present invention.

Reference is made to FIG. 1, which is a simplified illustration of a system for delivering real-time applications running in a server-based environment to a range of devices, in accordance with an embodiment of the present invention. FIG. 1 includes data network 10, wireless network 11 and devices 12-16, namely, tablet 12, mobile phone 13, smartwatch 14, drone 15 and smart glasses 16. Real-time applications for each device 12-16 run in real time on data network 10. Wireless network 11 is one of: the internet, 4G, 5G, cellular, wifi, Bluetooth® and ultra-wideband radio technology networks, or a combination thereof. BLUETOOTH is a registered trademark of BLUETOOTH SIG, INC.

An initial request by any of devices 12-16 for application services is directed to supervisor server 20, which sets up a peer-to-peer connection between the device and a selected application server 21. Communications with the selected application server 21 are directed via firewall 17, router 18 and switch 19.

Embodiments of the invention are described herein below based on the application layer architecture and related procedures for enabling edge applications over 3GPP® networks contained in "3rd Generation Partnership Project, Technical Specification, Group Services and System Aspects for an Architecture for enabling Edge Applications, Release 18" (3GPP™ TS 23.558 V18.4.0) published by the 3rd Generation Partnership Project (3GPP), the contents of which are hereby incorporated herein by reference in their entirety. 3GPP is a trademark of the European Telecommunications Standards Institute (ETSI). Other application layer architectures and other wireless networks are also within the scope of the invention.

Figure 2:
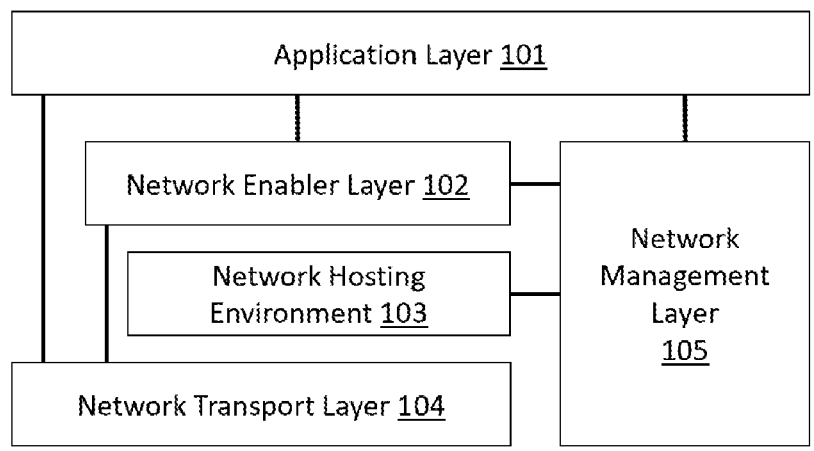
FIG. 2 is a simplified illustration of client-server computing capabilities supported in accordance with an embodiment of the present invention.

Reference is made to FIG. 2, illustrating client-server computing capabilities supported in accordance with an embodiment of the present invention. Application layer 101 is a consumer of computing capabilities over wireless networks. These computing capabilities are typically organized as: network enabler layer 102, network hosting environment 103, network transport layer 104, and network management layer 105.

Network enabler layer 102 performs the functions of service provisioning, registration and application server discovery. Service provisioning procedures supply the information required by the user equipment to access the application server services. The procedure takes the user equipment's location, service requirements, service preferences and connectivity information into account to provide the required configuration. Registration procedures allow entities (e.g. the user equipment and application server) in the network enabler layer to provide information about itself to other entities of the network enabler layer. Network application server discovery procedures enable the user equipment to obtain information about suitable application servers of interest in the data network. Network enabler layer 102 exposes services towards the application servers and enabler clients. The exposed capabilities include the services of network enabler layer 102 and the re-exposed and enhanced services of the wireless network. Network enabler layer 102 supports service continuity when a device moves to a new location and different application servers are more suitable for serving the device. Network enabler layer 102 supports secure communication amongst the enabler layer entities. Network enabler layer 102 interacts with the network computing service provider management system to trigger instantiation of a suitable application server as per application needs. Network enabler layer 102 also provides general architecture and principles applicable for charging of network enabling services provided by a network computing service provider to an application service provider.

Network hosting environment 103 is outside the scope of this description.

Network transport layer 104 for edge networks is specified in 3GPP TS 23.401 and 3GPP TS 23.501, the contents of which are hereby incorporated herein by reference in their entirety.

Network management layer 105 covers lifecycle management, provisioning, performance assurance and fault supervision. The network management layer for edge networks is specified in 3GPP TS 28.538, the contents of which are hereby incorporated herein by reference in their entirety.

Figure 3:
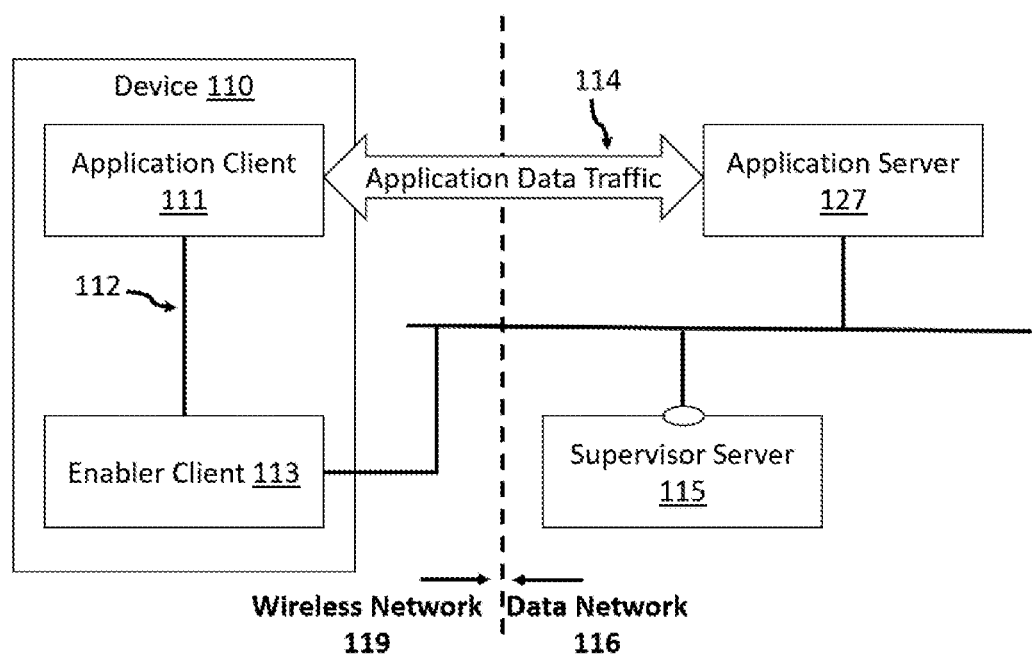
FIG. 3 is a simplified illustration of a service-based representation of an architecture for enabling client-server applications, in accordance with an embodiment of the present invention.

Reference is made to FIG. 3, illustrating a service-based representation of an architecture for enabling client-server applications, in accordance with an embodiment of the present invention. Device 110 and data network 116 are connected by wireless network 119. Application server 127 and supervisor server 115 are in data network 116. Application client 111 is the application resident in device 110 performing the client function. Enabler client 113 and application server 127 do not expose any service to the other functions. Application server 127 discovers supervisor server 115 via pre-configuration. Supervisor server 115 configuration information consists of one or more endpoint information (e.g. URI(s), FQDN(s), IP address(es)). Supervisor server 115 configuration information is provided to enabler client 113 from the wireless network, e.g., from the 3GPP core network. Alternatively, supervisor server 115 configuration information is provided to enabler client 113 from a network-aware application client 111 via reference point 112 within the device if application client 111 is configured with the supervisor server 115 configuration information and can communicate with enabler client 113.

Application server 127 configuration information is provided to enabler client 113 by the following service provisioning procedure. Enabler client 113 sends a service provisioning request to supervisor server 115. Upon receiving the request, supervisor server 115 performs an authorization check to verify whether enabler client 113 has authorization to perform the operation. If the processing of the request is successful, supervisor server 115 responds to the enabler client 113 request with a service provisioning response. If supervisor server 115 has identified the relevant application server 127 information, the service provisioning response includes a list of data network configuration information, e.g. identification of the data network, data network service area, and the required information (e.g. URI, IP address) for establishing a connection to application server 127. Once a peer-to-peer connection is established between application client 111 and application server 127, application data traffic 114 is transmitted over this peer-to-peer connection.

Figure 4:
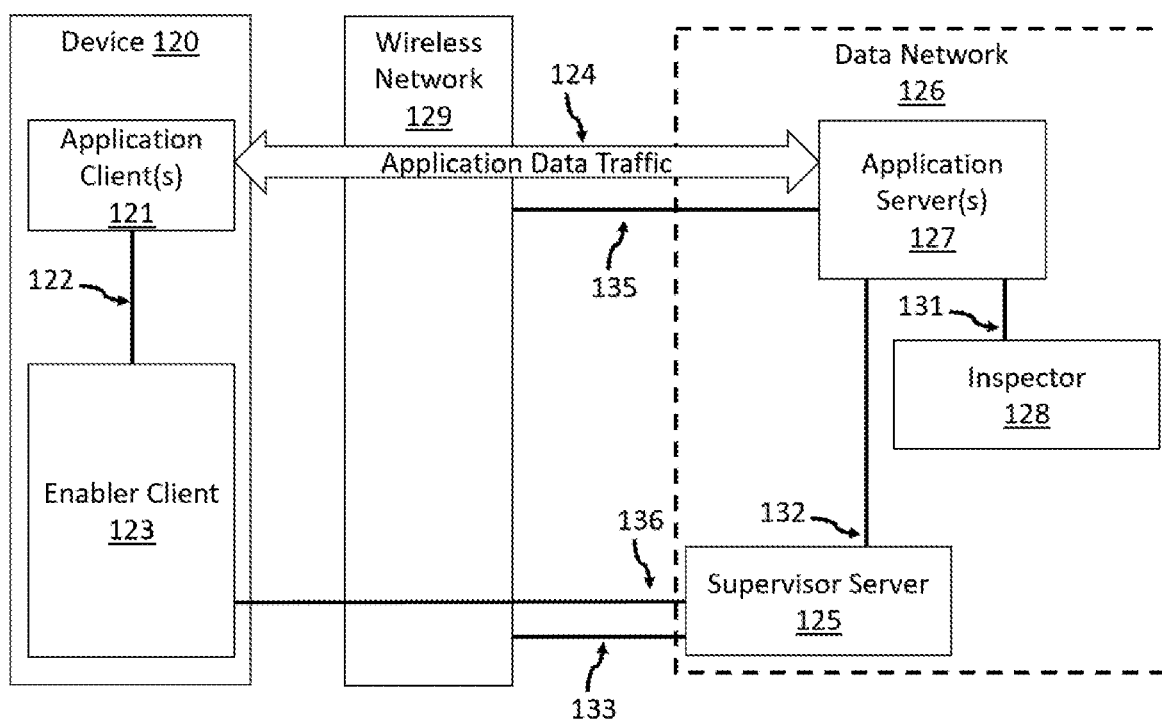
FIG. 4 is a reference point representation of an architecture for enabling client-server applications, in accordance with an embodiment of the present invention.

Reference is made to FIG. 4, which is a reference point representation of an architecture for enabling client-server applications, in accordance with an embodiment of the present invention. In certain embodiments of the current invention, supervisor server 125, inspector 128 and application server 127 reside within local data network 126. This ensures that communications, e.g., between supervisor server 125 and application server 127, are secured behind a firewall and cannot be easily sniffed by a third party. In other embodiments, supervisor server 125, inspector 128 and application server 127 do not reside within a single, local data network. Supervisor server 125 provides configurations related to application server 127 via reference point 132. Device 120 contains application client(s) 121 and enabler client 123. Reference point 122 enables interactions between application client(s) 121 and enabler client 123. Application server 127 interacts with wireless network 129 via reference point 135. Supervisor server 125 interacts with wireless network 129 via reference point 133. Enabler client 123 interacts with supervisor server 125 via reference point 136. Application client(s) 121 interacts with application server 127 via application data traffic 124.

Supervisor server 125 provides supporting functions needed for application server 127 and enabler client 123. Supervisor server 125 provides configuration information to enabler client 123, enabling exchange of application data traffic with the application server. Supervisor server 125 provides API invoker and API exposing functions, e.g., as specified in 3GPP TS 23.222, the contents of which are hereby incorporated herein by reference in their entirety. Supervisor server 125 interacts with wireless network 129 to access the capabilities of network functions. Supervisor server 125 provides registration functions, i.e., registration, update, and de-registration, for enabler client 123 and application server 127, and triggers application server instantiation on demand.

Enabler client 123 provides supporting functions needed for application client 121. These functions include retrieval of configuration information to enable the exchange of application data traffic 124 with application server 127, detecting user equipment mobility events, exposure of events of interest to application client 121, and retrieval of device (user equipment) ID.

Supervisor server 125 can be deployed in the mobile network operator domain or in a $3^{rd}$ party domain by a service provider to enable enabler client 123 to connect with application server 127. Supervisor server 125 provides network configuration information to enabler client 123. The network configuration information includes information for establishing a connection with application servers (such as URI) and information for enabler client 123 to distinguish amongst different application servers. Supervisor server 125 also supports the functionalities of registration, i.e., registration, update, and de-registration, and the functionalities of API invoker and API exposing function, e.g., as specified in 3GPP TS 23.222. Furthermore, supervisor server 125 interacts with wireless network 129 for accessing the capabilities of network functions.

Application server 127 is the application server performing the server functions. Application client 121 connects to application server 127 to avail the services of the application. Application server 127 can consume wireless network 129 capabilities. For example, if wireless network 129 is a 3GPP core network, by invoking 3GPP core network function APIs directly, if application server 127 is an entity trusted by the 3GPP core network, and by invoking the 3GPP core network capabilities through the capability exposure functions, i.e., Service Capability Exposure Function (SCEF) and Network Exposure Function (NEF/SCEF+NEF).

Inspector 128 interfaces with application server 127 to provide diagnostic monitoring of the client device. This includes: parsing diagnostic data that application server 127 receives from device 120, e.g., device sensor data (e.g., accelerometer, gyroscope); visualizing network performance diagnostics representing connection quality, e.g., number of packets lost; and, timestamps for benchmarking application server 127, e.g., how long it took the device to render a frame, and how long it took to send a frame to the device over the wireless network. Inspector 128 also enables sending debug control commands or packets to device 120 in order to check that packets are being sent and parsed correctly. One example is sending commands to control the client device screen brightness while visually monitoring the screen brightness.

Reference point 136 enables interactions between supervisor server 125 and enabler client 123, providing network configuration information to enabler client 123.

Reference point 122 enables interactions between application client 121 and enabler client 123. Reference point 122 supports registration, registration update and de-registration of application client 121 to enabler client 123, application server 127 discovery by application client 121, application context relocation triggering by application client 121, enabler client 123 services subscription and user equipment ID requests.

Reference point 132 enables interactions between supervisor server 125 and application server 127 and requests the setup of a data session between application client 121 and application server 127 with a specific QoS and receives QoS related information. Reference point 132 supports registration, and de-registration, of application server 127.

Reference point 131 enables interactions between inspector 128 and application server 127 for diagnostic monitoring of the client device.

Reference point 135 enables interactions between application server 127 and the wireless network functions and APIs for retrieval of network capability information.

Reference point 133 enables interactions between supervisor server 125 and the wireless network functions and APIs for retrieval of network capability information.

Figure 5:
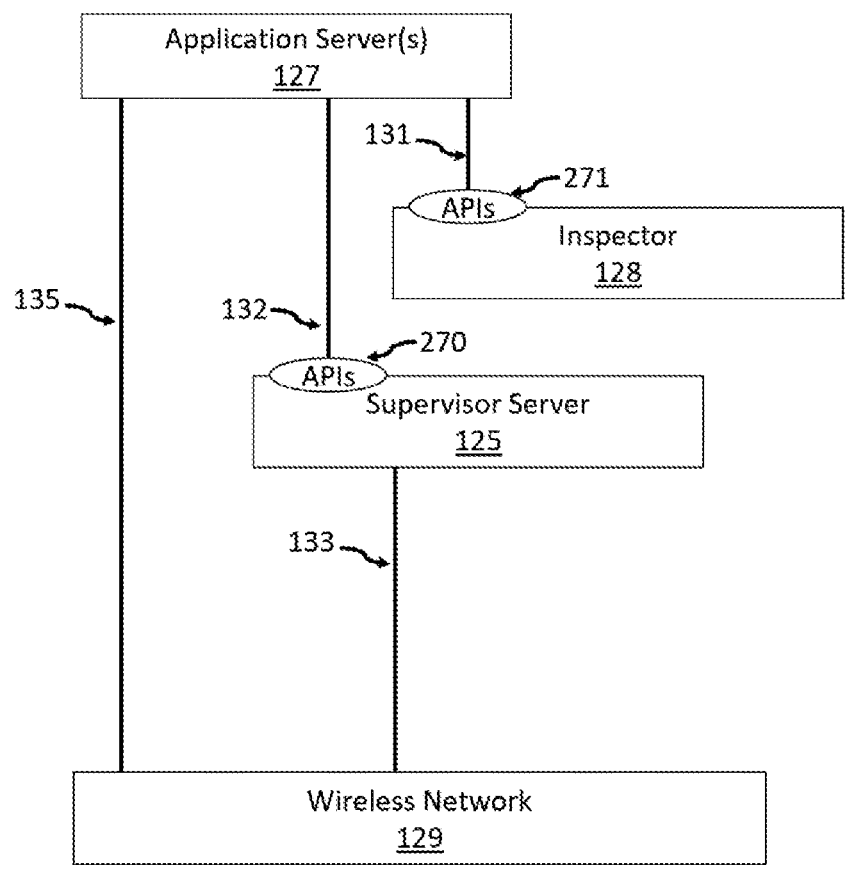
FIG. 5 shows the capability exposure for enabling client applications in a server-based environment, in accordance with an embodiment of the present invention.

Reference is made to FIG. 5, showing the capability exposure for enabling client applications, in accordance with an embodiment of the present invention. Capability exposure includes wireless network 129 (e.g., 5G), supervisor server 125 and inspector 128 capability exposure, to fulfill the needs of the client service operations. The capability exposure functionality is utilized by the functional entities depicted in FIG. 4 for enabling client applications, i.e., supervisor server 125, application server 127 and inspector 128. API 270 provide access to, inter alia, provisioning, registration and discovery requests, by the different entities. API 271 enables inspector 128 to access configuration settings for the client device through application server 127.

Figure 6:
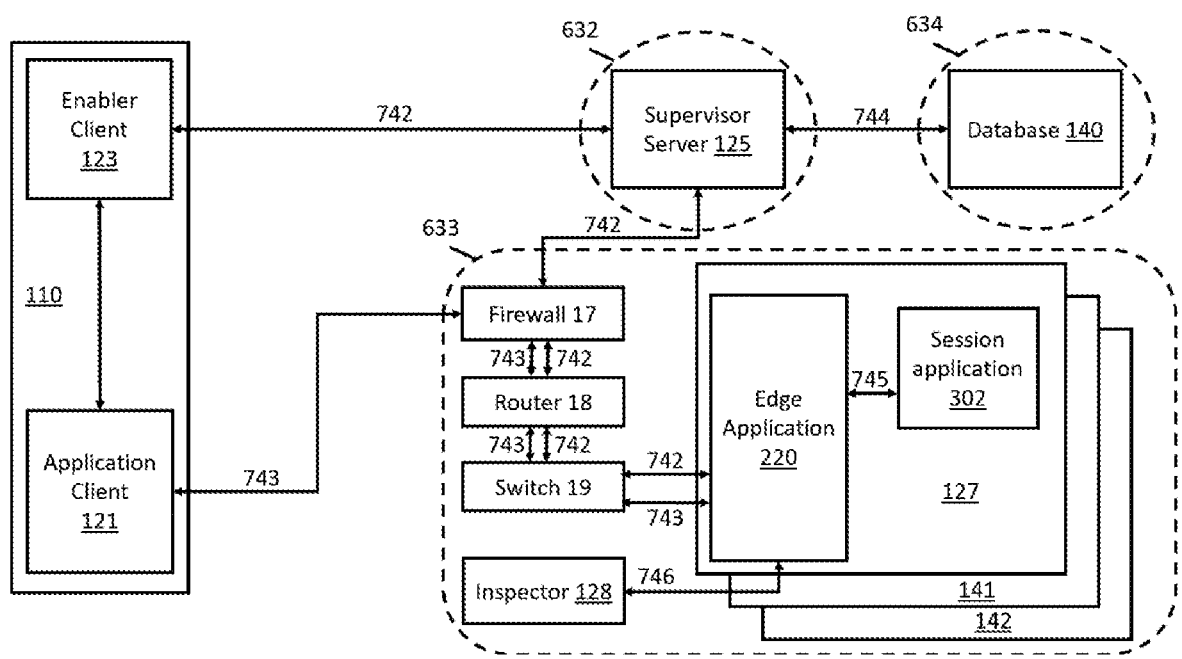
FIG. 6 is a system diagram of a portable client device paired with an application server, in accordance with an embodiment of the present invention.

Reference is made to FIG. 6, illustrating a portable client device paired with an application server, in accordance with an embodiment of the present invention. FIG. 6 shows three networks 632-634 and a client device 110. Enabler client 123 in device 110 requests an application session by sending URL request 742 to supervisor server 125 located in network 632. Supervisor server 125 consults database 140, located in separate network 633, which stores a table of applications that device 110 has permission to run as a dumb terminal, e.g., contact list, web browser, an emulator, game engine, word processor, camera application, drone application, to name but a few. Data traffic 744 represents communication between database 140 and supervisor server 125. Database 140 can be stored at different locations. For example, in other embodiments of the invention, database 140 is stored on supervisor server 125, in network 634 or in the cloud.

Based on the information retrieved from database 140, supervisor server 125 identifies server computer 127 that will run the applications for device 110, from among the available server computers 127, 141, 142, in network 633. Supervisor server 125 has access to other networks (not shown in FIG. 6) that contain additional server computers for running requested applications. In other embodiments, supervisor server 125 is in the same network 633 as application servers 127, 141, 142. In certain embodiments, supervisor server 125 controls router 18 to control network address translation within network 633. In the embodiment illustrated in FIG. 6, supervisor server 125 sets up a peer-to-peer session between edge application 220 and application client 121. This setup follows URL request 742 and includes sending the client device IP address and session ID to edge application 220, and sending the server 127 IP address and the session ID to user equipment 110. The session ID is incorporated into data traffic 743 in order to enable edge application 220 to verify that data is received from an authorized device and not from an imposter posing as the user.

After receiving the table of applications authorized for the current session with device 110, edge application 220 launches all of the listed applications, if those applications are not already running for this session, without requiring a request from the device 110 for any particular application.

Each application is configured to dynamically switch between two modes: active mode and idle mode. When an application runs in idle mode it utilizes fewer CPU and GPU resources than when it runs in active mode. For example, when an application switches from active mode to idle mode, the application reduces its frame rate, reduces the size of the output frames it generates, and/or reduces rendering complexity for its output. When an application is requested by the client device, the application enters active mode. After each application is launched, it enters idle mode in order to conserve server resources, until the application is requested by the client device. Having all applications running enables edge application 220 to stream application output with a minimum of delay to the client device when the user requests an application. Edge application 220 handles multiple sessions with different client devices concurrently.

FIG. 6 shows a single application 302 launched by edge application 220 for the current session with device 110. Data traffic 743 between server 127 and device 110 is transmitted via edge application 220, which acts as a filter between device 110 and application 302. The term "edge application" is intended to convey that all applications, such as session application 302, running on server 127 are exposed to external networks through this application. The "edge application" is thus situated at the edge of the local network in which server 127 is located, and communicates with external networks and with devices connected to those networks. Thus, data traffic 745 represents communications between edge application 220 and application 302.

FIG. 6 illustrates an embodiment in which session application 302 is run directly by edge application 220. Multiple sessions that run on server 127 use the same edge application 220 to launch their respective session applications. In other embodiments, certain sessions are each assigned a respective master application that runs the session and launches the applications used in that session. Database 140 indicates whether the session shall be run directly by the edge application or by a dedicated master application. Even when a session is run by a master application dedicated to that session, all application data traffic to and from the client device passes through edge application 220.

By transmitting all data traffic through edge application 220 any application can be paired with any type of client device, as edge application 220 filters inputs from the device to make them usable by the session application, and filters outputs from the session application to make them usable by the device. A list of filters for the session is stored in database 140 and loaded to edge application 220 when the session is set up.

Transmitting all data traffic through edge application 220 enables the server to monitor all communication with the session applications to thwart unauthorized access to user data and illegal activity. No sensitive user data is stored on the client device and all application software runs only on server 127, which is updated and managed by the system provider. This effectively eliminates security problems and vulnerabilities caused by old or outdated software.

Inspector 128 sends diagnostic commands 746 to user equipment 110 via edge application 220. Such commands include configuration settings for device 110. Verifying device responses to those commands allows inspector 128 to measure network response time. Inspector 128 receives diagnostic data 746 from user equipment 110, such as response time and acknowledgements of diagnostic commands, via edge application 220.

Figure 7:
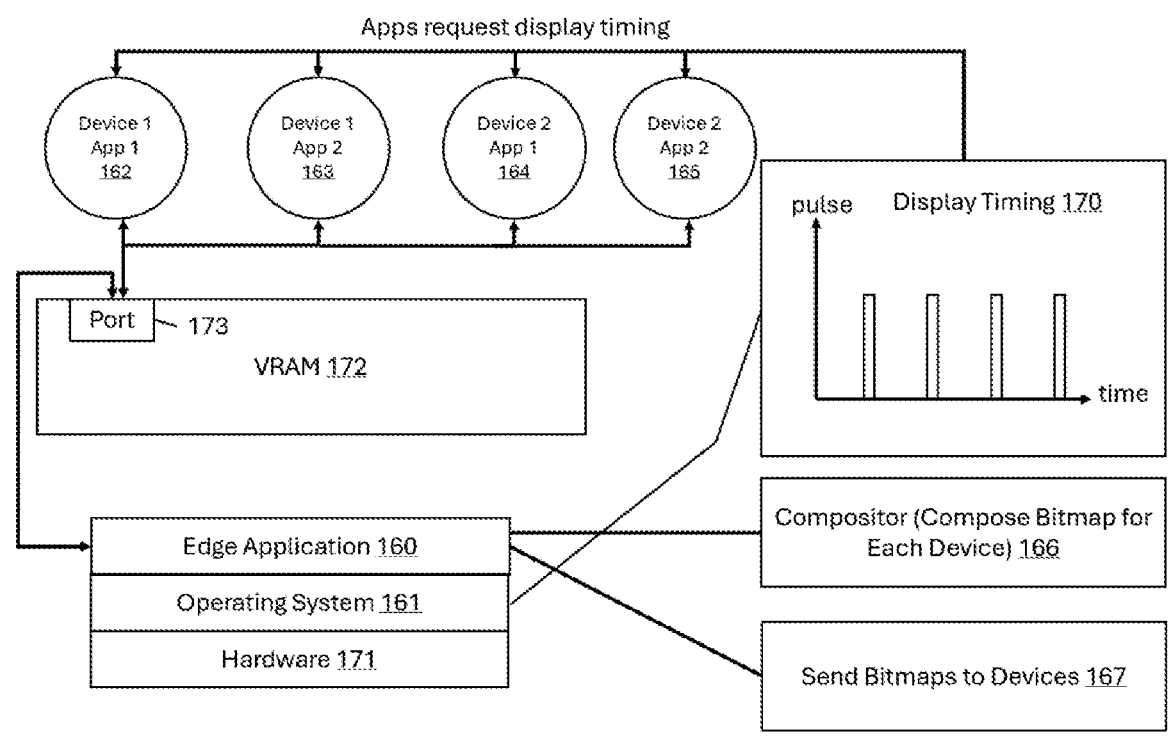
FIG. 7 is a block diagram illustrating applications running on an application server for two client devices, in accordance with an embodiment of the present invention.

Reference is made to FIG. 7, which is a block diagram illustrating applications running on an application server for two client devices, in accordance with an embodiment of the present invention. A server computer includes hardware 171, that includes at least one CPU, and video random-access memory (VRAM) 172, having port 173. The CPU runs operating system 161. Edge application 160 is a single application run on the CPU for all client devices connected to the server computer. In FIG. 7, edge application 160 launched applications 162-165 for two different devices, namely, applications 162 and 163 for a first client device, and applications 164 and 165 for a second client device.

In prior art computer systems that include a local display, the operating system includes a compositing window manager for the device display and the operating system updates the device display with output from the compositing window manager in accordance with a timing parameter for that display. The display timing parameter enables applications to be aware when the display is scheduled to be refreshed, in order for the application to ensure that at each refresh a complete frame is ready for the display. One approach to use a server computer to run applications for multiple devices, is to run multiple virtualized instances of an operating system for a like number of devices. In this case, hardware resources on the server are allocated between the different virtualized operating systems.

In systems according to the present invention, edge application 160 performs some of the functions that in the prior art are handled by the operating system, including the compositor. In systems according to the present invention, there is no actual display on the server computer; the displays are on the client devices. Nonetheless, operating system 161 provides display timing 170 to applications 162-165. This enables edge application 160 to retrieve output frames from each application from VRAM 172 in sync with the applications. For each device, edge application 160 creates an output bitmap by selecting outputs, or portions of outputs, from the applications running on behalf of that device. Edge application 160 compresses each output frame and sends it to its corresponding device.

As all applications are run under a single operating system, processing resources for all applications are managed by the operating system, in contrast to prior art systems that run multiple virtualize instances of an operating system. However, all applications receive the same display timing parameter 170. In practice, all applications run at this same frame rate. When, for example, the server runs applications for a car: an artificial intelligence (AI) driver assistance application and an infotainment system application, where the driver assistance application requires sending instructions to the car at a rate of 1024 Hz, and the infotainment display has a refresh rate of 30 Hz, both applications will run at 1024 Hz. When systems according to the present invention are deployed on a large scale for many devices, there will be different categories of server computer configured to run applications at different rates. Mobile phones and eleven watches typically will require relatively low frame rates, e.g., 30 fps or 60 fps, whereas certain AI-based applications or drone applications require high frame rates, e.g., 512 fps or 1024 fps. Each device will be assigned a server configured to run at such frame rate that supports the most demanding of the applications that will run on behalf of that device. All of the other applications running on behalf of that device will run at the same high frame rate.

Edge application 160 throttles the frame rate and compression ratio for each device up or down in accordance with the bandwidth available between each device and the server. Thus, even when an application generates output on the server at a high frame rate, edge application 160 may only transmit frames to the device at a lower frequency of frames per second, that is, at a lower frame rate. Edge application 160 throttles the frequency of frames transmitted per second independently for each device.

Figure 8:
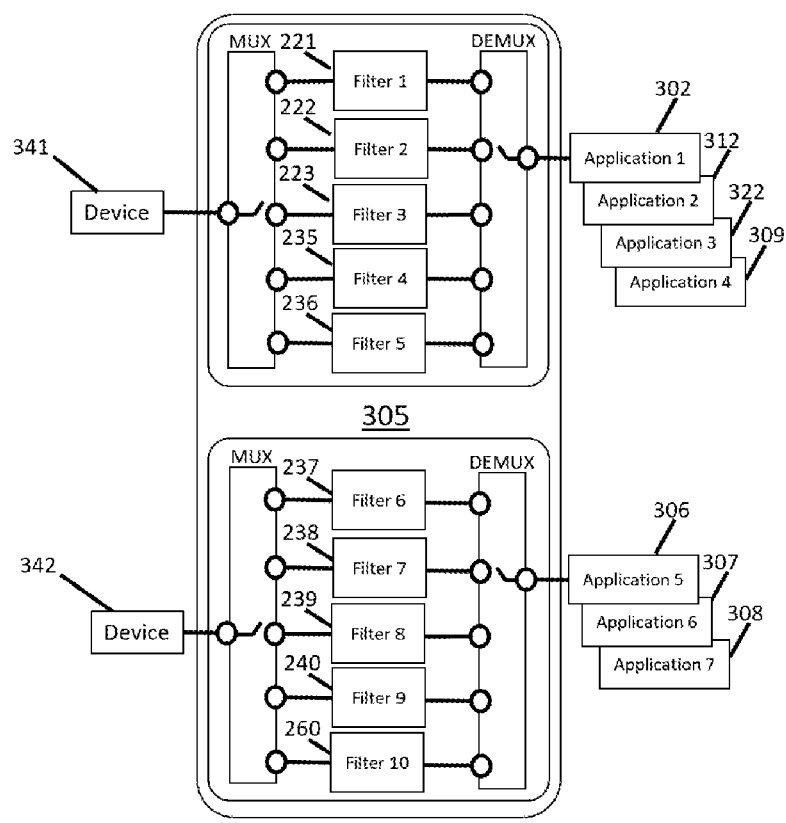
FIG. 8 is an illustration that represents a sensor and actuator hub function as a multiplexer/demultiplexer, in accordance with an embodiment of the present invention.

Reference is made to FIG. 8 illustrating a sensor and actuator hub function as a multiplexer/demultiplexer, in accordance with an embodiment of the present invention. FIG. 8 shows sensor and actuator hub function 305 as a demultiplexer for directing sensor inputs from device 341 to any of session applications 302, 309, 312, 322 through one of filters 221-223, 235, 236. In some cases the filter transforms the input. Similarly, sensor and actuator hub function 305 directs sensor inputs from device 342 to applications 306-308 through one of filters 237-240, 260. Actuator commands from each application are also filtered or transformed by sensor and actuator hub function 305 to ensure that the command is configured for the specific device 341, 342 to which it is directed.

The simplest filter passes the input or output data through to its designated application without modification. When an application expects input that cannot be provided by the client device, the filter translates or transforms input from the device sensors into the expected input. For example, a spreadsheet application supports keyboard shortcuts, such as ctrl+c and ctrl+v, but the device for which the application is running is an electronic watch that has a single button, but no keyboard. The plug-in provided to sensor and actuator hub 305 specifies that a single-press of the watch button shall be translated to the keyboard command ctrl+c, and a double-press of the watch button shall be translated to the keyboard command ctrl+v.

Similarly, when an application command cannot be performed by the client device, or when the intended actuatable element for an application output is absent in the client device, the filter translates the command or the application output into a format suitable for the client device. For example, application 302 sends haptic actuator commands but device 341 lacks a corresponding haptic device. In this case the haptic commands are converted into commands that activate another actuatable element included in the device, such as audio to be played by a speaker or a command to activate an illuminator, when the device includes a speaker or illuminator. The plug-in provided to sensor and actuator hub 305 for this application-device pair defines how each application output type should be translated for the device by sensor and actuator hub 305. Thus, each combination of a device with an application has a corresponding plug-in listing how the different inputs and outputs should be translated.

The plug-in can provide fan-out and fan-in functionality, namely, a single incoming command is translated into several lower-level commands (fan-out), and a group of commands is translated into a single, more powerful command (fan-in).

Sensor and actuator hub 305 receives all data sent to the applications running on the server. Thus, sensor and actuator hub 305 analyzes all incoming images and blocks certain images from reaching the application. This includes both images received from the external device and images received from an external server, e.g., from a social media application. Yet another filter checks that the received input originated at devices 341, 342 and is not from a malicious third party disguised as the device.

As discussed hereinabove, a table of filters is provided by database 140 specifying, for each session, which filter to apply for input to each application in the session and for output from each application in the session. The table further specifies whether each session shall run applications directly via edge application 220 or if a master application shall launch the user applications for that session and act as an operating system providing user interface logic to other session applications. A master application also interacts with the other applications in its session on behalf of the user in order to simplify the user's interactions with user applications. In this specification, master applications are also referred to as session control applications.

Table II is an example of a table storing session configuration data for three sessions, 1-3. Sessions 1 and 2 each include applications Game 1, Game 2, Game 3, Social media 1 and Social media 2. Thus, the user in sessions 1 and 2 is authorized to access these five user applications. Sessions 1 and 2 differ in terms of which filters are applied to inputs and outputs from each application. This may be for number of reasons, e.g., the sessions are run on different types of devices having different input and output capabilities. Session 3 includes four applications: Word processor, Spreadsheet, Address book and Game 5. Output from the Address book application is not filtered prior to being sent to the session 3 device. Sessions 1 and 3 are administered by respective master applications, whereas in session 2 edge application 220 provides the user interface to the session applications.

TABLE II

Session Configuration Data

| Session ID | Session Control Application? | Application | Input Filter | Output Filter |
|---|---|---|---|---|
| 1 | Y | Game 1 | Filter #5 | Filter #12 |
| | | Game 2 | Filter #7 | Filter #22 |
| | | Game 3 | Filter #2 | Filter #23 |
| | | Social media 1 | Filter #4 | Filter #24 |
| | | Social media 2 | Filter #3 | Filter #25 |
| 2 | N | Game 1 | Filter #16 | Filter #11 |
| | | Game 2 | Filter #27 | Filter #42 |
| | | Game 3 | Filter #1 | Filter #13 |
| | | Social media 1 | Filter #4 | Filter #14 |
| | | Social media 2 | Filter #3 | Filter #33 |
| 3 | Y | Word processor | Filter #20 | Filter #21 |
| | | Spreadsheet | Filter #43 | Filter #47 |
| | | Address book | Filter #65 | None |
| | | Game 5 | Filter #17 | Filter #37 |

Embodiments of the present invention enable two types of session for running real-time applications on a server for a remote device: temporary sessions and permanent sessions. A session is created in response to a service provisioning request from a client device. In a permanent session, certain data is stored after the client device is no longer receiving application data from the server. In contrast, in a temporary session, no data is stored after the client device no longer receives application data from the server, and when the session ends, server resources used in the session are freed for other uses and the state of the application at the end of the session is not stored for future use.

In certain embodiments of the invention, temporary sessions use dynamic allocations of application servers, whereas permanent sessions use static allocations of application servers. In this manner, applications in permanent sessions continue to run on the application server, even when the client device is not connected to the server, enabling the client device to resume its application with a minimum of network and application overhead. This minimizes latency, reducing lag and enhancing the user experience.

Certain use case scenarios require that an application continue to run on the server even after the session has ended, and the state of the application is either stored for future use or the state of the application continues to change dynamically so that the application is ready to be rejoined in the future. For example, a clock application continues to record the current time of day even after the user session has ended in order that the next time the user connects to the application, the clock will show the correct time of day.

Other examples of applications that employ permanent sessions are social media, gaming and office applications. Thus, a social media application that continues running and dynamically updates the user's feed on the server after a user ends the current session with the server, allows the client device to instantly and seamlessly reconnect to the application in the future without having to restart the application or retrieve the latest social media posts after the client requests to rejoin the application.

In interactive gaming applications, when a user exits a game and then resumes playing at a later time, the user can pick up from the point at which he previously exited the application, as his last state is stored by the application server. Office applications, such as word processor, spreadsheet and similar applications, where each user works on their own documents and uses personalized configuration settings also require saving the user state after a session has ended in order to resume the session and maintain the user's configuration settings at a later date.

Figure 9:
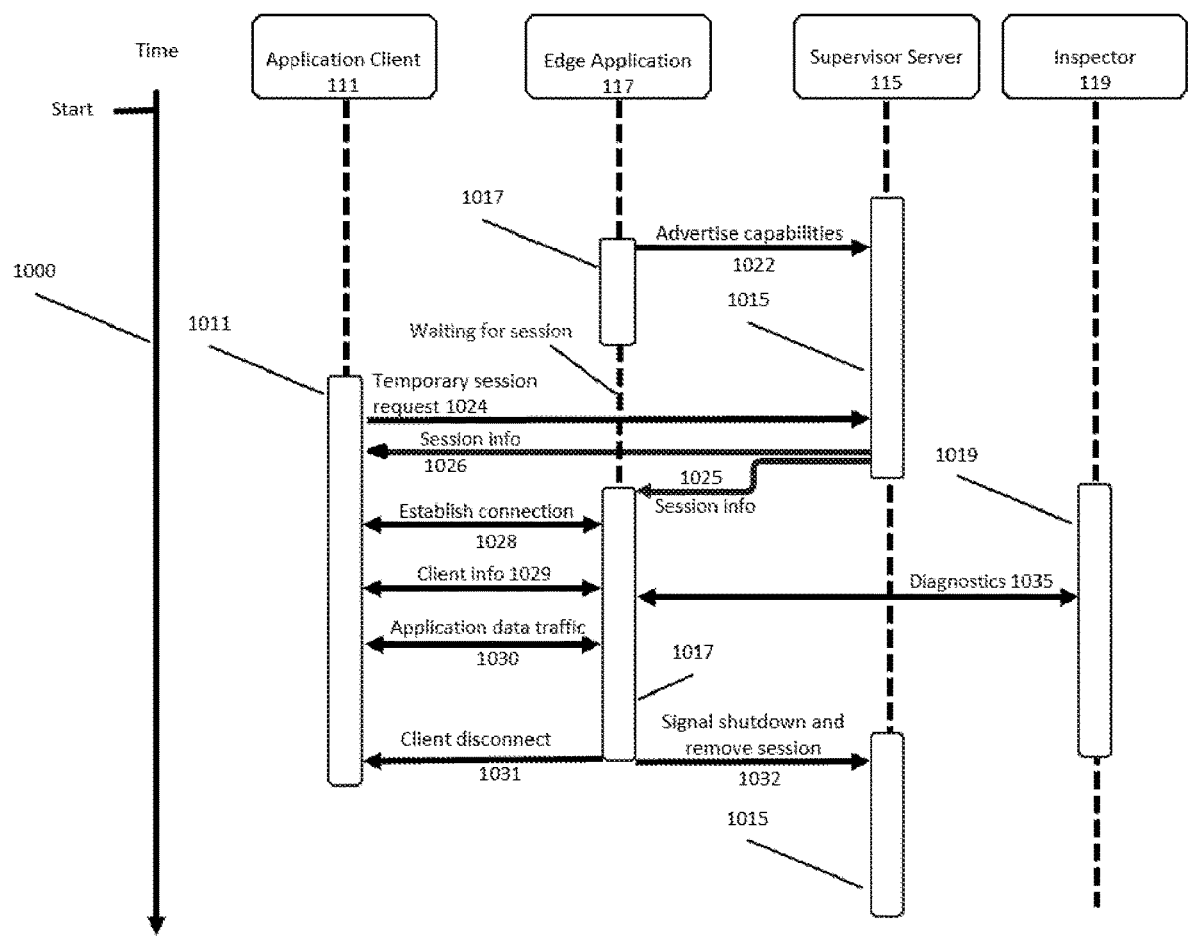
FIG. 9 is a timeline diagram illustrating steps performed by different entities in a temporary session between a server and a client device, in accordance with an embodiment of the present invention.

Reference is made to FIG. 9, which is a timeline diagram illustrating steps performed by different entities in a temporary session between a server and a client device, in accordance with an embodiment of the present invention. In FIG. 9, timeline 1000 progresses top to bottom. Entities shown participating in the provision of temporary sessions to client devices are: application client 111 in the client device, edge application 117 running on an application server, supervisor server 115 and inspector 119. An enabler client is required on the client device only when application client 111 cannot communicate with the network. This situation typically arises for dumb terminal devices designed for running permanent sessions described hereinbelow, whereas the temporary session illustrated in FIG. 9 is typically used to provide an interactive application, such as a game, to an internet browser application that has access to the network. Activity along timeline 1000 by each entity is indicated by one or more rectangles, namely activity 1011 by application client 111, activity 1015 by supervisor server 115, activity 1017 by edge application 117, and activity 1019 by inspector 119.

Supervisor server 115 runs a supervisor application that receives requests from client devices for real-time applications. When an application server is added to the network, edge application 117 running on that server advertises 1022 its capabilities to supervisor server 115. This allows supervisor server 115 to utilize the application server to fill service requests from client devices by instructing edge application 117 to launch the requested application. If the application server is already running one or more applications, this information is also advertised 1022 to supervisor server 115 which can then direct a client request for that application to edge application 117.

Application client 111 initiates a service request 1024, to supervisor server 115. In certain cases, the client requests the specific application; in other cases, the client request includes requirements for the server running the application, but not the specific application; in still other cases, the client is unaware which application is being requested and sends a request to access a URL that reaches the supervisor server. In this last case, the supervisor server determines which application corresponds to the requested URL. In response to the request by the client device, supervisor server 115 sends session information to both, application client 111 (session information 1026) and edge application 117 (session information 1025) to establish peer-to-peer connection 1028.

In certain embodiments of the invention, supervisor server 115 assigns a random session identifier (session ID) to each temporary session. This session ID is included in session information 1025 and 1026. Each permanent session, discussed hereinbelow, receives a fixed session ID that is stored in a database, also discussed below. In certain embodiments, the permanent session ID is based on the client device hardware ID. Although IP addresses and port numbers belong to levels 1-4 of the of the seven-layer OSI model of computer networking, the session ID can be inserted into application data traffic 1030 belonging to level 5 of the seven-layer OSI model of computer networking and can be used to ensure that all communication is between authorized entities. However, it has been found that fewer computing cycles are required to manage multiple clients interfacing with a single application server using unique port numbers rather than using unique session IDs. As such, power consumption is reduced by using unique port numbers rather than using unique session IDs.

In response to a request from edge application 117, application client 111 transmits information 1029 about the client device including sensors and other input equipment available on the client device, their resolution and their sampling rates, output equipment available on the client device and their resolution, and the types of data and compression standards supported by the client device. This information is used by the sensor and actuator hub running in edge application 117 to ensure compatibility with the client device. Thereafter, application data traffic 1030 is exchanged between application client 111 and edge application 117 over the peer-to-peer connection. When edge application 117 disconnects 1031 from application client 111, edge application 117 reports this to supervisor server 115, which then removes this client-server session from a list of active connections. Edge application 117 may disconnect from the application client when a time limit is imposed for each session. Alternatively, the client may close the browser tab in which the temporary session is running or the client may lose its internet connection. In such cases, edge application 117 will end the session after not hearing from the client for a period of time. Processing resources on the application server are thus freed and available to be assigned by supervisor server 115 for another session.

Inspector 119 interfaces with edge application 117 for diagnostic monitoring 1035 of the application and the client device.

Figure 10:
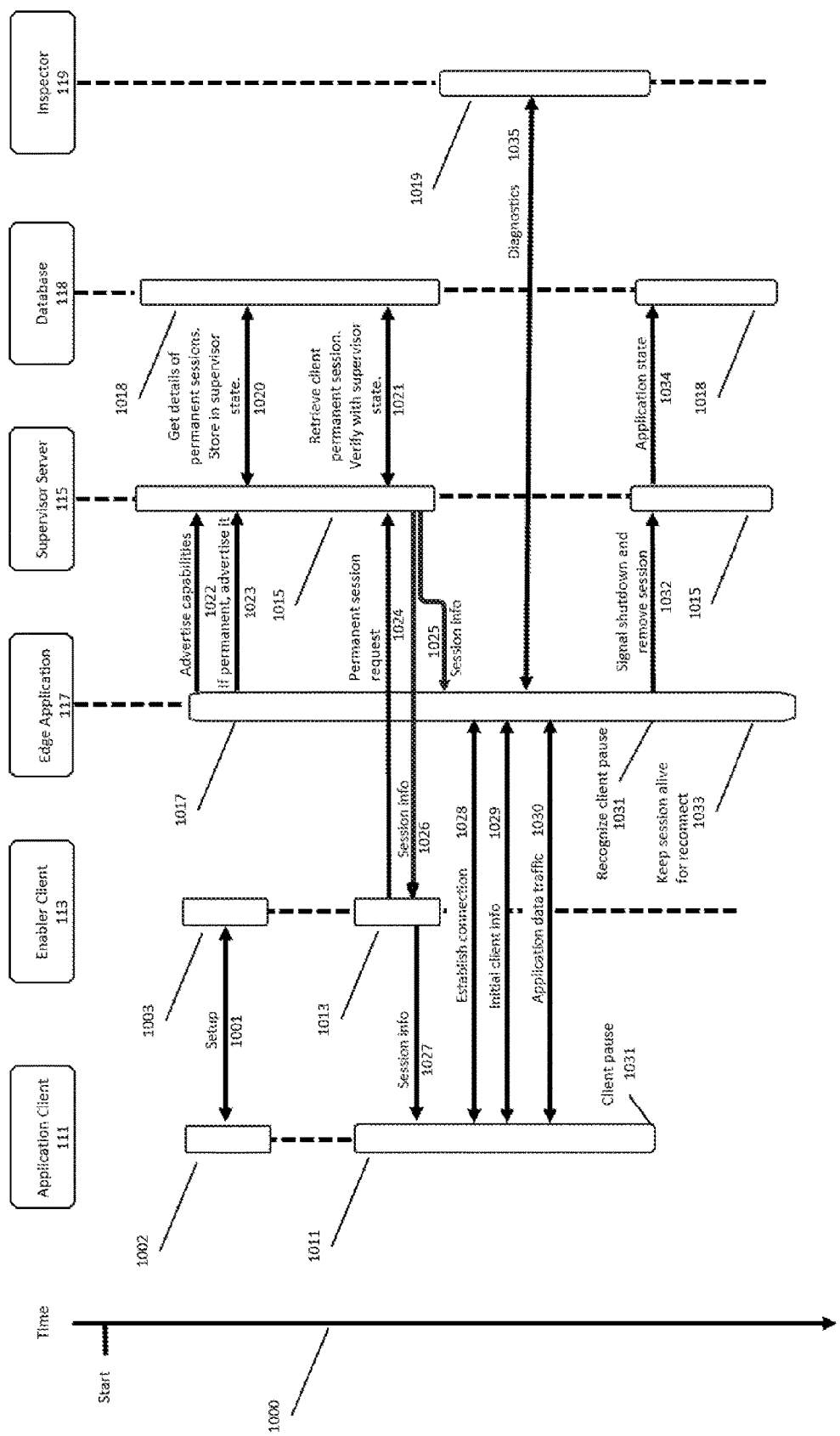
FIG. 10 is a timeline diagram illustrating steps performed by different entities in running a permanent session between a server and a client device, in accordance with an embodiment of the present invention.

Reference is made to FIG. 10, which is a timeline diagram illustrating steps performed by different entities in running a permanent session between a server and a client device, in accordance with an embodiment of the present invention. In FIG. 10, timeline 1000 progresses top to bottom. Entities shown participating in the provision of application sessions to client devices are: application client 111 and enabler client 113, both of which reside in the client device, edge application 117, supervisor server 115, inspector 119 and database 118. Enabler client 113 is required on the client device only when application client 111 cannot communicate with the network. This situation typically arises for dumb terminal devices designed for running permanent sessions as their primary functionality. If, however, application client 111 on the client device has access to the network, enabler client 113 is not required, and application client 111 communicates directly with supervisor server 115 and edge application 117. Activity along timeline 1000 by each entity is indicated by one or more rectangles, namely, activity 1011 by application client 111, activity 1013 by enabler client 113, activity 1015 by supervisor server 115, activity 1017 by edge application 117, activity 1018 by supervisor database 118, and activity 1019 by inspector 119.

Permanent user sessions enable a client device to resume a session with a minimum of overhead, as the session applications are already running on the server when the client device reconnects. In addition, when a peer-to-peer connection between the client device and the application server has been set up before, the connection can be restored in less time than it takes to establish a new peer-to-peer connection.

Database 118 stores all applications that are registered for use in permanent sessions and the corresponding list of client devices authorized to access each application. In certain cases, the client device data stored in database 118 is a unique hardware identifier of the client hardware. Database 118 also stores a state of each application in a permanent session. Thus, database 118 maps all client-server pairs that run permanent sessions. Database 118 can be stored at different locations, for example, in certain embodiments of the invention, database 118 is stored on supervisor server 115, in other embodiments, database 118 is stored on a separate server within the same local data network as supervisor server 115, and in yet other embodiments, database 118 is stored in the cloud.

Permanent session applications continue running on the server even when their output is not being sent the client device in order to minimize the time it takes to resume the application when requested by a user of the device. When its output is not being sent the client device, an application runs in idle mode in order to conserve server resources. In idle mode, an application will do one or more of the following: reduce its frame rate, reduce the size of the output frame, reduce rendering complexity, limit or restrict the amount CPU resources available to the application.

When an application server is added to the network, edge application 117 running on that server advertises its capabilities 1022 to supervisor server 115. Supervisor server 115 remains in contact with edge application 117 at all times via an open socket. If this connection is severed, edge application 117 continues all of its current sessions with their respective client devices, while continuously trying to reconnect to supervisor server 115. When this connection is restored, edge application 117 reports all of its currently running sessions and their corresponding session applications to supervisor server 115.

When a client device is added to the network, enabler client 113 and application client 111 run setup routine 1001. In accordance with the cardinality rules in 3GPP TS 23.558, one application client 111 may communicate with only one enabler client 113, but one enabler client 113 may communicate with one or more application clients 111 concurrently.

As discussed hereinabove with respect to FIG. 3, enabler client 113 sends a service provisioning request to supervisor server 115. Upon receiving a service provisioning request from enabler client 113, supervisor server 115 performs an authorization check to verify whether enabler client 113 has authorization to perform the operation. When the request is a request for a permanent session, supervisor server 115 checks database 118 to verify 1021 whether the client device in which enabler client 113 resides is authorized to access the requested application. If affirmative, supervisor server 115 retrieves the state of the application stored in database 118.

Thus, the main differences between the temporary session illustrated in FIG. 9 and the permanent session illustrated in FIG. 10 are: (1) the addition of database 118 and enabler client 113 in FIG. 10, and (2) when a permanent session is paused 1031, e.g., when the client device is turned off, edge application 117 in FIG. 10 continues to run 1033 run all of the session applications for that session, albeit in idle mode. In some cases, the state of the session that was paused is stored 1034 in database 118.

Figure 11:
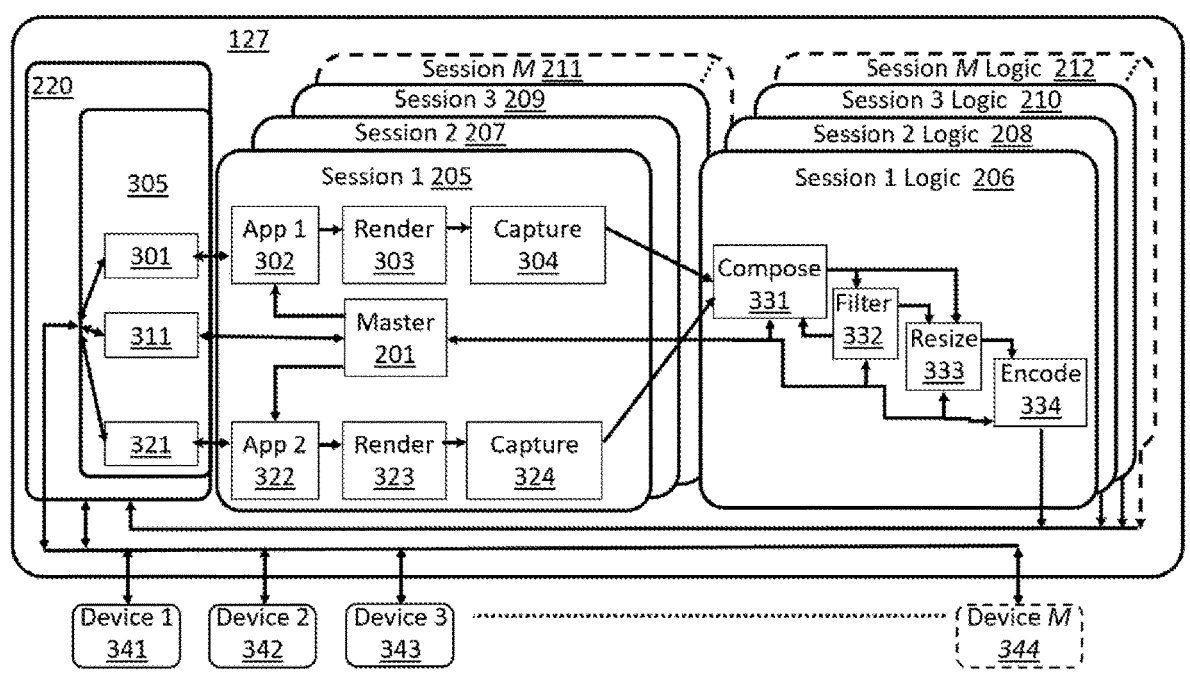
FIG. 11 is a block diagram illustrating applications running on an application server for a plurality of client devices, in accordance with an embodiment of the present invention.

Reference is made to FIG. 11, which is a block diagram illustrating applications running on an application server for a plurality of client devices, in accordance with an embodiment of the present invention. As explained hereinabove, edge application 220 runs on application server 127 and communicates with a plurality of devices 341-344 over wireless networks. For each device, application server 127 runs a corresponding session 205, 207, 209, 211, and applies session logic 206, 208, 210, 212 to outputs from the session, respectively. In FIG. 11, session 205 runs applications 201, 302, 322, for device 341; similarly, sessions 207, 209 and 211, run applications for devices 342-344, respectively. Not all sessions include the same applications.

An important feature of the present invention is that devices 341-344 do not communicate directly with the applications running in their sessions. Rather, all communications between a client device and a session application running on application server 127 pass through edge application 220. Edge application 220 runs sensor and actuator hub 305, which acts as a filter for all inputs from the devices and for all actuator commands to the devices. Sensor and actuator hub 305 provides a number of features discussed hereinbelow.

The sensor and actuator hub provides freedom to run applications that are not compatible with the client device. For example, certain applications expect inputs from particular sensors, such as touchscreen or joystick input. When these sensors are not present in the client device, the sensor and actuator hub translates other inputs from the client device into the touchscreen or joystick inputs expected by the application, e.g., if the device is an electronic watch with a rotatable bezel, rotation of the watch bezel is translated into touchscreen commands. Similarly, commands to the client device are translated and adapted to the features of the client device. For example, a command to play a sound on an electronic watch lacking a speaker is translated by the sensor and actuator hub into an activation pattern for light emitting diodes on the watch.

The sensor and actuator hub also provides security by filtering all input before it reaches any of the session applications. The image filters to be applied for each application-device pair are stored in the database that stores all of the plug-ins for the sensor and actuator hub. For example, the sensor and actuator hub checks that all input is arriving from an authorized device and not from a malicious third party. The sensor and actuator hub does, however, store all received requests and commands to enable the service provider to investigate any suspicious activity. In another example, the session application is a web browser and the sensor and actuator hub checks all URL requests and does not forward requests for unauthorized URLs, e.g., adult websites in a session configured for a child user. The sensor and actuator hub also filters all data, such as images, sent to a session application. Thus, for example, when the connected device includes a camera, the sensor and actuator hub can be configured to act as a filter to block certain types of images. In this case, the sensor and actuator hub analyzes images from the camera and selectively blocks certain images from being forwarded to the session applications. Alternatively, the sensor and actuator hub selectively removes certain identified portions from an image while forwarding the rest of the image.

Generally speaking, inputs from client devices 341-344 are filtered and/or transformed by sensor and actuator hub 305 configured to translate inputs from the device to inputs, and to input formats, expected by the applications. In FIG. 11, plug-ins 301, 311, 321 are provided to sensor and actuator hub 305 for each application 302, 201 and 322. Each plug-in includes a table of translations customized for that application to be compatible with the device in that session and any image review operations to be performed on incoming images. In FIG. 11 plug-ins 301, 311, 321 configure applications inputs and outputs for device 341. One edge application 220 and one sensor and actuator hub 305 support multiple concurrent sessions for multiple devices.

As discussed with regard to FIGS. 6, 9 and 10, a session is initiated for a client device. Permanent sessions, discussed with reference to FIG. 10, are typically used to enable sessions that run multiple applications and allow the user of the device to switch between different applications. To this end, when certain permanent sessions begins, a dedicated master application is run for that session on application server 127. This master application can be seen as the operating system GUI for all applications and settings in the session. The master application selects which user applications are presented to the user, provides user interface logic and hosts the applications in the session. The master application acts as the user's personal assistant to activate user applications, and interacts with those user applications on behalf of the user in order to simplify interactions with the applications. In other embodiments, this master application acts as a window manager, to enable the user to navigate and switch between different applications in the session through a very rudimentary set of gestures. This is particularly useful when the client device has a small display, such as an electronic watch, and GUI elements on the display would be difficult to operate and interact with. In such cases, the master application enables the user to control the session using the simple input set available on the client device. The master application then processes these inputs to manage the session. For example, on an electronic watch, the active application streamed to the watch is toggled in response to hand wave gestures performed above the watch.

In FIG. 11, master application 201 controls session 205. Initially, master application 201 generates a user interface and logic for a user of device 341 to select applications 302 and 322. This GUI is rendered and sent to device 341 by edge application 220. User input to this GUI entered on device 341 is sent back to edge application 220 that forwards the user input back to master application 201 to control session 205 in accordance with the user's input.

The type of user input will vary in accordance with the features of device 341. For example, when device 341 is a mobile phone, the user input may be touchscreen input, and when device 341 is a digital watch with a rotatable bezel, the input may be a rotation of the bezel. Sensor and actuator hub 305 translates the input into an intelligible input for master application 201 in accordance with settings set by the user or system administrator. In other embodiments, the sensor hub functions of translating inputs received on the device are performed by the master application.

An API is provided for applications to send commands to devices 341-344. Examples of such commands include requests for sensor data from the device and control commands to sensors, actuators and output equipment on the device. For example, device 342 is a drone equipped with accelerometer, gyroscope and barometric pressure sensors, that provide feedback for navigating the drone, and cameras for videography or photography. Application 302 is a drone application that requires data from the drone's accelerometer, gyroscope and barometric pressure sensors to pilot the drone. Using the provided API, application 302 requests this sensor data from drone 342. After piloting the drone to a desired location, application 302 uses the API to send commands to the drone cameras to capture images. As discussed above, these requests and commands are sent via the sensor and actuator hub, such that application 302 does not need to configure requests in accordance with the specific command syntax required for the particular drone, as this translation is handled by the sensor and actuator hub.

Each application 302, 322 that generates output, e.g., a video game or social media application, renders its audiovisual and other outputs in rendering steps 303, 323, respectively, as output frames for each application 302, 322. 3D graphics rendering is typically handled by graphics hardware, such as one or more GPUs, in the application server. Capture functions 304, 324 transform all of these output frames into a texture either by copying the frames or by providing a handle to each frame and converting the handle into a texture format, whereby each frame becomes a tile in a single texture. The GPU then applies session logic 206 to all of the application outputs in one session. Session logic 206 determines which applications in the session will be displayed on device 341 and how they will be displayed, as described hereinbelow. Session logic for each session is set by the session's master application or by the edge application.

Compose function 331 assembles output for device 341. For example, user applications 302 and 322 are slot machine applications that the user is playing at the same time. Compose function 331 assembles a mosaic of the multiple slot machines that the user is playing into an output that is sent to device 341. The arrangement of the mosaic is configured by master application 201, for example, the outputs are arranged in a grid or a stack that appear to belong to a single application. The look and feel of the mosaic is independent of applications 302 and 322. In general, compose function 331 assembles an output image, to be sent to device 341, from disparate portions of different application outputs in a session.

Compose function 331 can be further configured by master application 201 to overlay text or images onto the output image, e.g., to provide an indication each time one of the slot machines wins, as reported by the slot machine applications.

In another example, applications 302 and 322 are different applications having a scrollable feed. In prior art handheld devices, the user views each application separately, e.g., selecting a first app on the home screen to scroll through the feed from that app, and selecting a second app on the home screen to scroll through the feed from the second app. Thus, each application provides a feed that is viewed without data from other apps. In contrast, according to the present invention, composer function 331 assembles a mosaic of feeds from applications 302 and 322 into a contiguous, scrollable feed. The user scrolls through this single feed to see data from all of the different apps, without having to change the active app.

Alternatively, composer function 331 assembles a mosaic of windows to be presented concurrently on device 341, where each window is a feed from one of applications 302 and 322. When the user performs a scroll gesture, each application's feed scrolls within its respective window at the same rate. This feature is further discussed hereinbelow with reference to FIGS. 24 and 25. As explained hereinbelow, scrolling is performed by the application server, not the client device. The application server sends images of the scrolled feed to device 341, such that the data appears to be scrolling on the device 341 display.

As discussed above, a scroll command registered by device 341 is sent to the sensor and actuator hub. In certain embodiments of the invention, device 341 doesn't recognize the input as a scroll command per se, but rather as one or more inputs, e.g., a sequence of touch gestures, and the sensor and actuator hub translates this sequence into a scroll command. The scroll command is sent to master application 201 which issues a scroll command to each of the running applications 302 and 322 included in the mosaic by compose function 331. This is one example of how master application 201 acts as the user's personal assistant to interact with applications 302 and 322. This example also illustrates how the user does not directly interact with the applications 302 and 322 in session 205, but rather via the sensor and actuator hub and master application 201.

In another example, applications 302 and 322 are gaming applications, e.g., slot machine apps, and composer function 331 is configured, by master application 201, to present only one of these applications to the user of device 341. In response to user inputs on device 341, master application 201 switches which application shall be selected by composer function 331 to be presented on device 341. For example, in response to a left-to-right swipe gesture master application 201 switches to the next game application, and in response to a right-to-left swipe gesture master application 201 switches to the previous game application. This user interface for switching between game applications is similar to switching between television channels or between videos on a video streaming channel. Significantly, this user interface is not part of any of applications 302 and 322, but rather master application 201. This demonstrates how the present invention simplifies the user interface to the session.

In certain embodiments of the invention, master application 201 further customizes the image output sent to device 341 by instructing session logic 206 to run filter function 332 on the output of compose function 331. Some examples of filter function 332 are discussed hereinbelow.

Optical character recognition (OCR) is one example of filter function 332. In this case, the GPU performing session logic 206 scans the output of compose function 331 for text, identifies the text characters, and reports the filter results to master application 201. For example, application 302 is a social media app that has disabled hyperlinks to URLs that appear in user posts in order to prevent users from leaving the app. The OCR filter applied to the output of application 302 recognizes that the text is a URL and identifies the location of the URL text within compose function 331 output. A subsequent tap gesture at the corresponding location on the device 341 display is forwarded by the sensor and actuator hub to master application 201 which maps the tap gesture to the URL text, and generates a hyperlink command to open a browser and go to the URL. Thus, hyperlink functionality that was not provided, or was disabled, by application 302 is restored by systems in accordance with the present invention.

In another example, filter function 332 identifies sections of an image that contain text that is not selectable because it is inside an image. However, after filter function 332 identifies the text, master application 201 instructs compose function 331 to overlay the identified text onto the output screen, to enable the user to interact with this element as text, e.g., to select and copy the text.

Another example filter is a search function that searches through the texture created from the outputs of capture functions 304 and 324 for a particular search item, e.g., images of cats, and identifies sections within the texture that satisfy the search criteria, i.e., sections that include cats. This can be across outputs from multiple applications, or across multiple outputs from a single application. Based on the output of this filter, compose function 331 assembles a frame containing only the identified cat-related content. In contrast to the previous examples, in this example filter function 332 preceded compose function 331.

Some background is required in order to understand how the server can scan an extensive scrollable feed. Although applications that have extended feeds seem to have stored the entire feed locally on the user device enabling the user to scroll through the feed, this is not the case. Rather, the app generates a single output window, roughly equal in size to the output on the user device. In response to a scroll command, the application changes the content of the output window by dynamically fetching new content to simulate scrolling through a long feed.

Therefore, in order to enable the application server to scan an extended feed, master application 201 issues multiple scroll commands to applications 302 and 322 in order that each application generate multiple output screens. Master application 201 instructs capture commands 304, 324 to store the series of output images from each of these applications to a single texture. Master application 201 then instructs filter function 332 to identify cats within this series of output images. A new call to compose function 331 collects the identified cat content and creates an output image showing only this content. This enables systems in accordance with the invention to customize output from user applications based on the user's preferences, despite the user applications not enabling such functionality.

Other search criteria are adult content, advertisements, and paid posts in social media apps. Once the search filter identifies these search elements in application output, compose function 331 removes the identified content from the feed, either by replacing it with other content or by stitching together the other elements of the application output to create output with the same look and feel as the original application, but without the objectionable content identified by the filter function. In certain embodiments, the service provider hosting the application server replaces advertisements in the applications with its own advertisements. As the system runs in real time, the system is operable to replace advertisements or promotional content in videos as well as images.

After the application output has been filtered and customized for the user by compose function 331 and filters 332, rescale function 333 scales the assembled image to the resolution of the client device display. This reduces network bandwidth, as well as memory and processing requirements for the client device, compared to a scenario in which high resolution frames are compressed and sent. In that case, the client device has to decompress the large frames-requiring more processing and more memory, and then downsize the large frames for the smaller display, requiring further processing and additional memory. The additional processing would also delay presenting the frame on the client device display.

The scaled image to be sent to the client device is compressed and encoded by encode function 334 in accordance with compression standards supported by the client device. As discussed hereinabove with reference to FIGS. 9 and 10, supported compression formats and other user device parameters, such as display resolution, are sent by the client device to the application server. See element 1029 in FIGS. 9 and 10. Compression parameters, such as the compression standard to be used (JPEG, PNG, H.264, etc.), the number of frames per second and the target bit rate, are configured by master application 201, or by edge application 220, and these parameters can be changed dynamically, in real-time, by master application 201, or by edge application 220.

Figure 12:
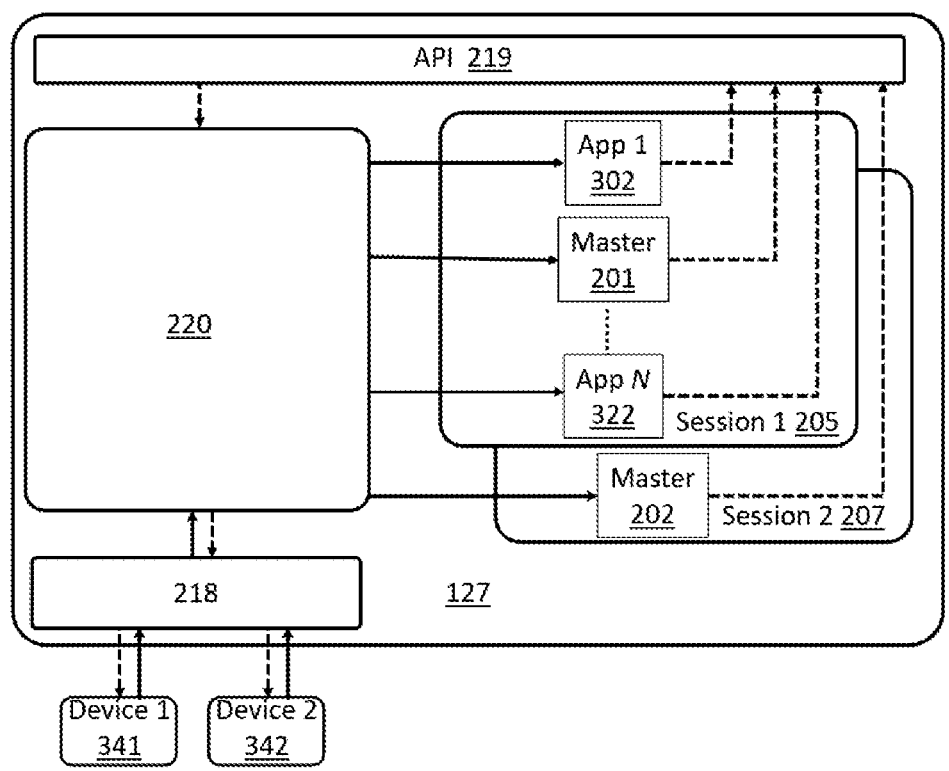
FIG. 12 is a block diagram illustrating how master applications and session applications running on a server issue actuator commands to client devices, and receive sensor data from those devices, in accordance with an embodiment of the present invention.

Reference is made to FIG. 12, which is a block diagram illustrating how master applications and session applications issue actuator commands to remote devices, and receive sensor data from those devices, in accordance with an embodiment of the present invention. Edge application 220 is shown interfacing with two sessions, 205 and 207, for devices 341 and 342, respectively. Edge application 220 and sessions 205 and 207 run on application server 127, and data between devices 341, 342 and application server 127 is transmitted via communication interface 218 over wireless networks. Commands and requests from master application 201, and from session applications 302 and 322, are communicated via API 219 as indicated by the dashed arrows and are directed to edge application 220. Edge application 220 forwards these requests to device 341. Similarly, commands and requests from master application 202 are also directed at edge application 220, via API 219 as indicated by the dashed arrows. Edge application 220 forwards these requests to device 342. For example, when any of applications 201, 302, 322 requests input from one of the sensors on device 341, the application sends the request via API 219 to edge application 220, and edge application 220 sends a request to device 341 in accordance with the received request. The sensor and actuator hub in edge application 220 is instructed via API 219 to forward the requested sensor input to a particular port, and the requesting application listens for input on that port. The sensor and actuator hub pauses forwarding sensor data to one or more ports when the requesting application is no longer being presented on device 341. However, an application may request that sensor data continue to be forwarded even when the application is no longer being presented on the device. Any of applications 201, 302, 322 can also send actuator commands to device 341 via edge application 220 using API 219. For example, device 341 is a drone and a drone pilot application 302 sends commands that direct the drone via edge application 220 using API 219.

The application client running on the client device may limit the actuation parameters. For example, an electronic watch includes a vibrator. The application client running on the watch limits the duration of vibrations in order to prevent unintended extended vibrations due to bugs or errors.

All inputs from devices 341, 342, including touch input, keyboard input and input from other sensors, to applications 201, 202, 302 and 322, are received at the sensor and actuator hub in edge application 220 and forwarded to the relevant application, as indicated by the solid arrows. In certain cases, the application expects different input than that provided by the device. In these cases, the sensor and actuator hub translates the input into an appropriate format for the application. Touch input is serialized by the sensor and actuator hub into a standard syntax, such as JSON Data Interchange Syntax, defined in standard ECMA-404, The JSON Data Interchange Syntax, $2^{nd}$ Edition (2017), published by ECMA International. Touch input is also processed by the sensor and actuator hub, e.g., to identify gestures, or to convert touch input to keyboard input.

Figure 13:
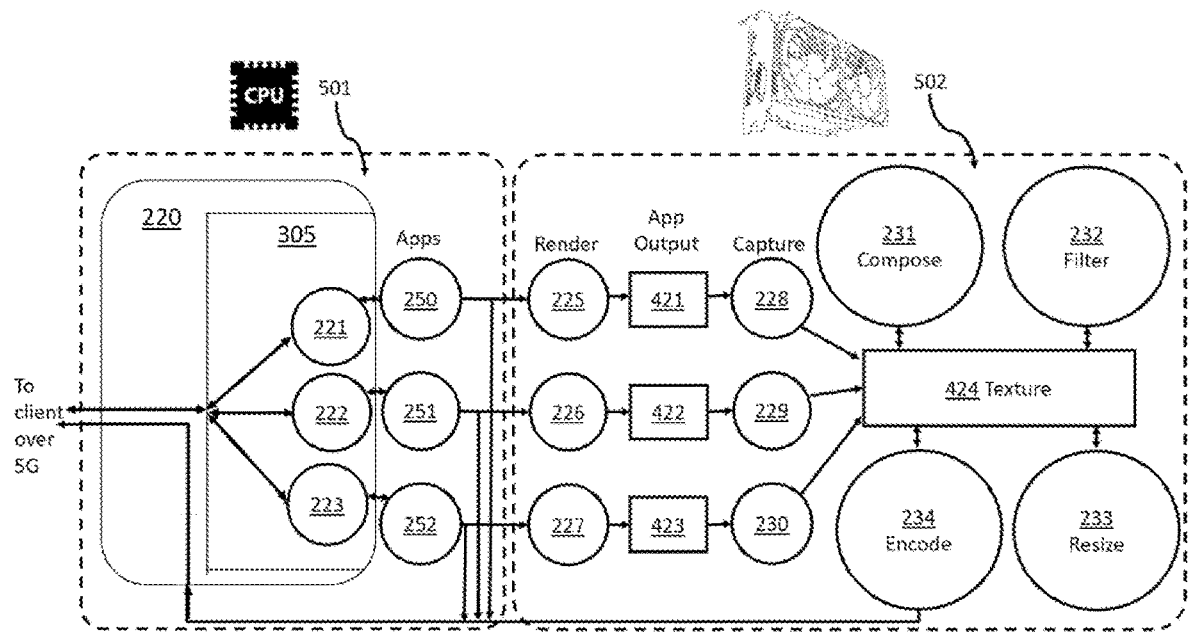
FIG. 13 is a simplified illustration of an application server running a plurality of user applications for a client device, in accordance with an embodiment of the present invention.

Reference is made to FIG. 13 which is a simplified illustration of an application server running a plurality of user applications for a remote client device, in accordance with an embodiment of the present invention. The application server typically includes multiple central processing units (CPUs) 501 and multiple graphics processing units (GPUs) 502.

CPU 501 runs edge application 220, that communicates with the client device over a peer-to-peer connection. Sensor and actuator hub 305, discussed hereinabove, is part of edge application 220. Edge application 220 either launches a master application for each session, which hosts all applications in the session, or else edge application 220 launches all applications in the session. In other embodiments, edge application 220 launches all applications in the session and a master application programmatically defines the final output to be presented on the client device.

FIG. 13 shows user applications 250-252 for a particular client device, running concurrently on CPU 501. Input from the client device received by edge application 220 for any of applications 250-252 passes through sensor and actuator hub 305 that directs each received input to its intended session and to its intended application within that session, using the appropriate plug-in 221-223 for that application in that session, in order that the input is of a type and format expected by the application. Similarly, certain non-image outputs from applications 250-252 pass through the sensor and actuator hub, that, using the appropriate plug-in 221-223, adapts the output to a format and type supported by the client device. Other output, such as audio output from applications 250-252, is compressed and encoded by edge application 220 on CPU 501. Under certain circumstances, audio output from applications 250-252 is sent to GPU 502 for processing, e.g., to filter audio output using artificial intelligence algorithms optimized for GPUS.

GPU 502 includes hardware for rendering image and video output from applications 250-252. GPU 502 hardware can also be used to accelerate artificial intelligence and machine learning processes for graphic and non-graphic data, e.g., audio.

GPU 502 performs render operations 225-227, that generate frames 421-423 for applications 250-252, respectively. When each render operation 225-227 has been completed, GPU 502 reports to edge application 220 that the operation has been completed. When the session is run by a master application, GPU 502 reports to the master application. Frames 421-423 are stored in a shared memory on GPU 502. Next, GPU 502 performs capture functions 228-230 to transform frames 421-423 into a texture 424. This is done either by copying the frames or by providing a handle to each frame and converting the handle into a texture format. Each frame is a tile in texture 424.

Compose function 231 assembles data from texture 424 to be encoded and sent to the client device. Upon completing each function, GPU 502 reports to edge application 220 that the function has been completed. Thus, when capture functions 228-230 and compose function 231 have been completed, GPU reports to edge application 220 when each of those functions has been completed. When the session is run by a master application, GPU 502 reports to the master application. Compose function 231, filter function 232, resize function 233 and encode function 234 all use shared texture memory 424. The operations of these functions are discussed hereinabove.

In embodiments of the invention, each application server is connected to multiple devices for multiple users at the same time, and GPU 502 processes output for these different users at the same time. For example, a single server runs a plurality of instances of a single user application for a like plurality of different users. The GPU output is a high-resolution frame made up of smaller tiles where each tile is an output frame for a respective instance of the user application. Each tile is then compressed by encoder 234, and sent to a respective device over the network.

To illustrate the scalability of this system, assume each GPU 502 output frame is made up of 100 tiles for 100 different users. A server equipped with 100 such GPUs could support up to 10,000 different users of the same user application, simultaneously. This is more efficient than each user running the user application locally on its device. For each device, the server computer runs a corresponding instance of the user application for the user of that particular device, with or without a corresponding master application. In other embodiments of the invention, the server runs different user applications for the different users, with or without a corresponding master application for each user.

Systems according to the present invention provide an extremely wide range of user applications for a wide range of user devices—in fact, any application that runs on a server computer can be provided to any device, as the server computer ensures that outputs from the applications are configured in a manner supported by the device, and inputs from the device are translated into formats expected by each user application. Inputs from the device include control data, such as touchscreen input entered by the user of a mobile phone device, and sensor inputs from a drone that are used by the application to direct the drone. Any type of data supported by the client device can be sent to the server, and when that data is not what is expected by the application, sensor and actuator hub plug-ins 221-223 are configured to translate those inputs into formats expected by the application. Thus, all translations are handled by the application server, not the device, and the translations are performed outside the application running on the server by a separate sensor and actuator hub function 305.

In accordance with embodiments of the invention, a device having a display receives output for the applications running on the server in a compressed format, using a compression standard supported by the device. In the case of visual output to be rendered on the device display, an output image for the entire display is created by compose function 231 and filter function 232. Resize function 233 resizes the output image to match the device display resolution. In this way, client device requirements and costs are kept to a minimum, and battery life on the client device is extended, as resizing and other rendering functions, other than image decompression, are not performed by the client device. In such systems, the client device is unaware of the graphical user interface (GUI) elements in the user application on its display screen, as the entire screen, including the GUI, is a decompressed image. In order to support user interaction with the GUI, the client device transmits user input, e.g., the x, y coordinates of touch gestures detected by a touchscreen sensor on the client device, to edge application 220 on the application server. Sensor and actuator hub 305 maps the touchscreen sensor outputs to gestures performed on GUI elements at the touched locations.

In certain embodiments of the invention, the application server runs user applications to generate output in response to input from the client device at a rate that is significantly higher than the refresh rate of the output component in the client device. This enables the client device to react to user input without any perceptible delay to the user, as the response to input to frame n on the device is presented by frame n+1 on the device, where frame n and frame n+1 are successive frames on the device. Two examples are visual and audio outputs in response to user input.

For example, a display and speaker on a client device each has a refresh rate of 30 frames per second, and the user application generates audio and visual output for that display and speaker in response to user inputs. In this case, the application server configures the user application to generate at least 60 audio and video output frames per second. In this illustrative example, the application server runs the user application at an even higher frame rate of 120 Hz and configures the user equipment touchscreen to sample touch input at 500 Hz. At these rates, the application server is able to receive user input from the client device, generate new image and audio outputs in response thereto, compress the outputs and transmit the outputs to the client device to be decompressed, all within the time that the device display and speaker are set to be refreshed. This gives the user the impression that the device responded to his input without any lag or delay.

In another illustrative example, using the same performance rates as above, the user performs an input gesture to scroll the display, and that gesture is transmitted back to the server. The server renders a scrolled frame in response to the received gesture, in under 10 msec, whereby the next frame is sent to the device, is decompressed and ready for the display within the 30 ms refresh rate of the display. To the user, this appears as zero lag between the user input and seeing the response to that input on the display.

Yet another example is drone and robot navigation, where a session application running on the server computer continuously calculates, by dead reckoning, the position, the orientation, and the velocity of the drone or robot, in response to inputs from inertial instruments including motion sensors (accelerometers), rotation sensors (gyroscopes), a barometric altimeter, magnetic sensors (magnetometers) and speed measuring sensors on the drone or robot. In this case, the session application running on the server computer generates navigational commands at a rate faster than the rate at which the drone or robot is configured to update its course. The session application running on the server computer also dynamically regulates (i) the rate at which drone or robot navigation is updated, and (ii) the sampling rates of the sensors on the drone or robot, to reduce device power consumption and network traffic. The session application can throttle up the sampling rate when external conditions warrant, e.g., when the drone encounters turbulence or the robot enters a more active environment such as a busy building or street.

Thus, under certain conditions, the session application running on the server computer configures some or all device sensors to operate at a lower frequency than the maximum sampling rate, e.g., to save device battery power, and when a low sampling rate is sufficient to support the application. For example, a camera sensor mounted on a drone or robot is configured to take photos. Although the camera can capture a high number of frames per second, the session application throttles down the frame capture rate during uneventful segments of drone travel in order to reduce network traffic and extend drone battery life. The session application can throttle up the sampling rate when external conditions warrant, e.g., an item of interest is identified in an image captured by the camera. In these cases, the session application sends instructions to the client device to increase the sensor sampling rate. As discussed herein, the session application communicates with the edge application via an API, and the edge application communicates with the client device to change the sampling rate.

In certain embodiments of the invention, certain client devices include an on-chip display controller and an on-chip display buffer for storing decoded display frames. For these units, the encoded bitstream sent by the application server includes a display refresh command after each compressed frame. This ensures that the client device refreshes the display precisely after an entire new frame is received. This prevents two problems: it minimizes latency as each new frame is presented on the display as soon as it arrives, and it also prevents the display controller from refreshing the display while the display buffer is being updated. If a display is refreshed from a buffer that is only partly updated, an effect known as "tearing" occurs, in which visible artifacts appear on the display between updated and non-updated sections of the frame.

Other client devices include an on-chip display buffer whereby the display is continuously updated row by row. After each row has been refreshed on the display, that row is updated with new data.

Systems in accordance with the present invention have a number of significant advantages. A first advantage is security. Using peer-to-peer connections between IPv6 or IPv4 addresses over wireless networks ensures that all communications across these channels are secure and are not vulnerable to being intercepted or "sniffed" during transmission, in contrast to communications over the Internet.

A second advantage is the time it takes from when a user attempts to open an application on a client device until that application appears as open and active on the client device, when the selected application is running in a permanent session on the server. Because permanent sessions use static IP addresses, the paired IP addresses are always ready to connect with a minimum of overhead, and user applications can be installed and running on the application server at the static IP addresses even before the client device connects to the wireless network.

Moreover, for the permanent sessions discussed hereinabove with respect to FIG. 10, the peer-to-peer connection between each client device and the corresponding application server running applications for that device is established when the client device connects to the wireless network-regardless of whether the user has indicated that he wishes to use any particular user application. When the user selects a user application on the client device, that user application is already running, and real-time output from the user application is already stored in the application server memory. This minimizes the amount of time required for the application server to send output data to the client device requesting a particular user application.

Similarly, because all registered user applications run in a permanent session on the application server even before the user opens any particular user application on the client device, the user can instantaneously switch between user applications as the master application, or edge application 220, only needs to instruct GPU 502 to select a different area of texture 424 to be sent to the client device. There is no need to start the newly selected user application, as all of the registered user applications for this user are already running and generating output in texture 424 on the server.

In embodiments of the invention, visual output from the application is compressed by encode function 234 using the best available compression standard supported by the client device, in order to minimize any latency in rendering video frames for the user. In certain embodiments of the invention, the application server changes the compression standard in real-time in order to reduce latency and adapt to the needs of the network and the client device. Typically, audio compression is performed by CPU 501, and CPU 501 can change the audio compression standard in real-time in order to reduce latency and adapt to the needs of the network and the client device.

A third advantage is reduced hardware cost and power consumption compared to prior art thin client systems. In prior art thin client systems, a server sends user interface scripts to the client device. This requires providing a graphics engine on the user equipment, increasing device cost. In contrast, systems according to the present invention have no such requirement, as all graphics rendering is handled by the server, equipped with advanced graphics hardware to render output frames that can be transmitted as compressed images. The graphics engines in prior art thin clients use more power than hardware codecs in the user equipment in embodiments of the present invention.

Figure 14:
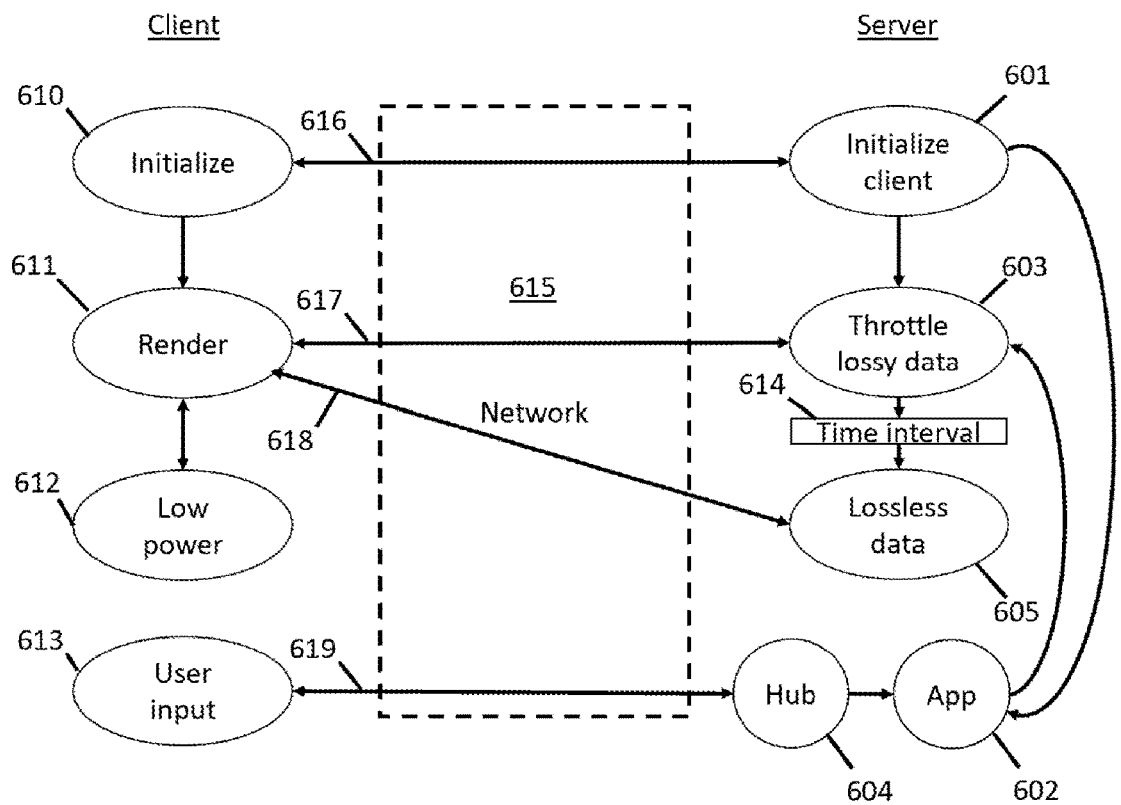
FIGS. 14-16 are simplified illustrations of machine states on a server and on a client, in accordance with an embodiment of the present invention.

Reference is made to FIG. 14, illustrating machine states on a server and on a client, in accordance with an embodiment of the present invention. The client and server communicate with each other over network 615, inter alia, the internet, 4G, 5G, cellular, wifi, Bluetooth and ultra-wideband radio technology networks, or a combination thereof. Server states 601-605 enable the server to run applications for a user of the client device and stream user interface data to the client. Client states 610-613 enable the client to provide the user interface to the user, while maintaining a minimal data cycle in order to maximize battery life on the client device. Depending on the application, the user interface data includes images, video, audio, haptics and other media types supported by the application or by the client device.

At server state 601, the server sets configuration settings based on parameters of the target client device. These parameters include client display settings, such as resolution and refresh rate, client hardware settings, including memory size, and a list of those compression standards supported by hardware and/or software on the client device. The server configures settings for generating and sending user interface data to the client device based on these client device parameters. The client device parameters are provided to the server either by the client, or by a domain name server or other server, that stores parameters for client devices associated with a user. Communication channel 616 represents communication between the server and the client for setting up the client-server connection.

Client state 610 includes logging the client into network 615 and receiving a list of applications that run on the server and to which client access is authorized. In certain embodiments of the invention, the client device presents the list to the user, the user selects applications from the list, and the client sends the selection to the server.

At server state 602, the server runs applications for the client and renders user interface output for each application. The server selects or combines outputs from one or more of the running applications and prepares that data to be sent to the client. In certain embodiments of the invention, the server sends only user interface data related to the applications selected by the user. Despite this, the server runs all of the applications that the client is authorized to access in order that user interface output from those applications is available to be sent should the user request it.

At server state 603 the selected or combined outputs from one or more of the running applications is transmitted 617 to the client over network 615 as lossy compressed data, in accordance with one or more compression standard supported by the client device, e.g., JPEG, MP-3. The compressed data is transmitted in the form of IP packets. The server throttles the amount of data traffic up or down, in accordance with feedback from the client. In embodiments of the invention, a frequency of transmission, namely, the number of frames per second sent to the client, is dynamically throttled up or down by the edge application in accordance with changes in the monitored bandwidth of the communicative connection to the client. When all IP packets in a transmission have successfully been received by the client, the client sends an acknowledgement to the server. In response, the server may increase the number of IP packets to use in the next transmission of data to the client or it may increase the frequency of transmissions, that is, the number of frames per second transmitted to the client. This next transmission contains either new user interface data, or it is a retransmission of previously transmitted data, at a higher quality than the previous transmission, using more IP packets and a lower compression ratio. Conversely, if not all IP packets have been received by the client the server decreases the number of IP packets to use in the next data transfer to the client. In this manner, the number of IP packets and the related image quality of the lossy compressed user interface data is continually being throttled up or down by the server in response to network traffic in real time, based on feedback from the client and the network.

In certain embodiments of the invention, the server uses constant bitrate (CBR) encoding in order to take advantage of all of the capacity on the peer-to-peer connection. Rate adaptation is used to adapt the transmission rate to the varying network capacity. Thus, the server sets a target bitrate and dynamically adjusts the target bitrate up or down depending on packet loss and latency spikes indicated by acknowledge signals sent by the client to the server in order to ensure that the user does not experience lag between frames. When the bitrate drops, the compression ratio is increased to reduce the bandwidth required for the next frame. At times, in response to a low reported bitrate, the server compresses the current frame to fit into a single IP packet in order to maintain a target frame rate on the client device despite the low bitrate. Although variations in complexity between different frames makes it difficult to control the bitrate, as more complex scenes require more bits, the server attempts to maintain a target frame rate by controlling the maximum bitrate and throttling that maximum up or down.

In certain embodiments of the invention, the server employs the SCREAM (Self-Clocked Rate Adaptation for Multimedia) congestion control algorithm to regulate the bitrate. SCREAM congestion control algorithm code is available at https://github.com/EricssonResearch/scream.

User interface data for an app may remain unchanged for an extended period of time. In such cases, data traffic is reduced by not retransmitting the data multiple times, and power on the client device is conserved by not changing the data in the client display buffer. However, artifacts in the displayed image due to lossy compression become more noticeable to the user when the image is unchanged for an extended amount of time. In order to reduce noticeable artifacts, the server retransmits the user interface data at a higher quality.

At client state 611, the client renders the user interface data received from the server. Unchanged user interface data is not retransmitted to the client unless the quality is increased in the subsequent transmission. This minimizes processing by the client, as compared to streaming technologies that stream frames to a client device at the same rate as the client display refresh rate, even when successive frames are unchanged. Moreover, in prior art devices, the display frame buffer is updated at the display refresh rate even when the data is unchanged, whereas in embodiments of the current invention the display frame buffer is not written to while the user interface data remains unchanged. Furthermore, in order to minimize power consumption on the client device, the client device initiates low power state 612 between receiving transmissions of user interface data. Thus, the client duty cycle is kept to a minimum.

At a certain number of IP packets, it is possible to transmit the user interface data using a lossless compression method. The number of IP packets necessary for lossless compression depends on a number of factors, e.g., client device display resolution and complexity of the audiovisual user interface data. In certain embodiments, only the video or image data is transmitted using a lossless compression format, whereas the audio remains in a lossy format.

At server state 605 the selected or combined outputs from one or more of the running applications is transmitted 618 to the client device over network 615 as lossless compressed data. The lossless retransmission is conditional upon the server identifying no change in the user interface data during a threshold time interval 614. Thus, high bandwidth, lossless data transmissions are limited to data that remains unchanged for an extended amount of time.

The bitrate typically reaches a level that enables lossless compression only after the user interface data has already been transmitted at a high resolution using lossy compression. Therefore, the improvement in quality afforded by the lossless compressed data over the current data presented on the client device is marginal. This motivates a number of decisions discussed hereinbelow.

First, user interface data is transmitted in a lossless compression format conditional upon the server identifying no change in the user interface data during threshold time interval 614. This is because the improvement in quality afforded by the lossless compressed data will hardly be noticed by the user if the user interface data does not remain on the client device for more than a threshold time.

Second, lossless user interface data replaces the lossy user interface data on the client device display section-by-section, rather than all at once. As the differences between the high resolution lossy image and the lossless version of the same image are small, updating the display one section at a time will not cause artifacts that are noticeable to the user. In addition, transmitting an image of user interface data for an entire client display screen in a single transmission may congest the network unnecessarily. For example, if the user interface data changes directly after the lossless transmission begins, the changed user interface data needs to be sent, yet the network is congested with the lossless user interface data that is no longer relevant. Moreover, the client will not respond to the changed user interface data until it has received the complete frame of lossless compressed data. In order to avoid this pitfall, the server divides the user interface data into segments, such as strips of a screen of user interface data, and transmits each segment separately, in the lossless compression format. Thus, each segment that arrives at the client device is presented as it arrives; it does not require the entire screen of user interface data to arrive in order to be presented. As mentioned, such section-by-section updating of the image on the client screen will not cause noticeable artifacts, and it is therefore a good option. Moreover, when the entire screen of user interface data is transmitted in a single transmission, if any part of the transmission fails to arrive, the client cannot use those portions of the transmission that did arrive. In contrast, transmitting segments of lossless data enables using those segments that arrive, even if other segments do not arrive at the client device.

Yet another advantage of transmitting the lossless compressed data in segments, is that if the user interface data changes after some, but not all, segments have been transmitted, the server can cancel sending the unsent segments. This prevents unnecessary network congestion and thus, unnecessary delays for the client to receive the changed user interface data, in contrast to the case where the server sends the entire frame of user interface data in one transmission and cannot halt the transmission mid-frame.

Even after the server arrives at state 605, the server returns to state 603 once the user interface data changes, i.e., any changed or new user interface data is first transmitted in a lossy commission format.

At client state 613, the client polls user inputs entered on the client device and transmits 619 the user input to the server over wireless network 615. The user input is received at sensor and actuator hub 604 on the server. Sensor and actuator hub 604 interprets the received input and channels the input to one or more of the current running applications. In certain cases, the application expects input of a certain type not supported by the client device. In such cases, sensor and actuator hub 604 translates the input from the client into a format expected by the application. For example, an application expects joystick input, and the client device is a watch that doesn't receive joystick input. In this case, input from sensors present in the watch, e.g., gyroscope input, is translated into joystick inputs by sensor and actuator hub 604. In another example, the client device enables touch input along the perimeter of the screen but not along the interior of the screen, and sensor and actuator hub 604 translates touch input detected along the perimeter of the screen into touchscreen inputs on the interior of the screen for the target application. Sensor and actuator hub 604 also translates application outputs into formats compatible with the client device. As an example, the client device features a ring of light emitters surrounding the display. Certain application outputs, e.g., haptic outputs or audio outputs, are translated by sensor and actuator hub 604 into an activation pattern for the light emitters.

Figure 15:
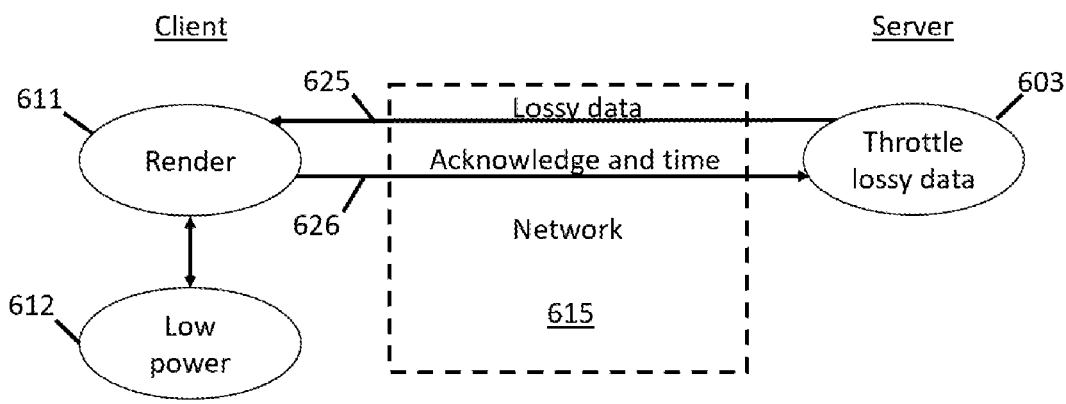

Reference is made to FIG. 15, showing server state 603 and client states 611 and 612, in accordance with an embodiment of the present invention. At state 603, data is compressed and sent 625 to the client device. In order to ensure that the user experiences applications running on the server as if they are running on the client device, the present invention is configured to enable the server to respond to user input and transmit that response to the client in less time than a frame is refreshed on the client display. For example, a client device display has a refresh rate of 60 frames per second (60 Hz), whereby each frame is allotted 16.67 milliseconds. In this case, the system is configured to enable the client to send user input to the server, receive updated user interface data from the server in accordance with the received input, and render the updated user interface data, in under 16.67 milliseconds. In practice, the server runs applications at a frame rate that is at least twice the target client device display refresh rate, e.g., 120 Hz in the current example, in order to enable the server to receive input from the client, generate application output in response to the input, and transmit the output to the client and have the client decompress the output, all within the target budget of the target client device display refresh rate. If the client display refresh rate is 120 Hz, the time budget is 8.33 milliseconds, and the server runs applications for this client at a rate of at least 240 Hz, rendering each new frame in under 4.16 milliseconds.

The client measures transmission time and decompression time and sends 626 those measurements to the server over wireless network 615 as input to calculate the maximum size of a transmission that will meet the time budget requirements. Alternatively, the client sends 626 timestamps to the server, and the server calculates the transmission and/or decode time based on the received timestamps.

The client also sends 626 an acknowledge signal to the server over wireless network 615 to indicate that all IP packets in the previous transmission have been successfully received. In certain embodiments of the invention, the client does not confirm receipt of data to the server in order to reduce data traffic over the network.

If the server receives an acknowledge signal from the client indicating that all sent IP packets have been successfully received, the server may increase the number of IP packets in order to improve the quality of the lossy compressed data if the anticipated transmission and decode time for the higher quality image are within the time budget. Conversely, if the previous transmission exceeded the time budget, the server may reduce the number of IP packets in the next transmission in order to reduce transmission and decode time.

If the server does not receive the acknowledge signal from the client, indicating that not all IP packets arrived at the client, the next action by the server depends on whether the user interface data has already arrived at the client in a previous transmission, e.g., the current failed transmission was a retransmission of user interface data using a higher number of IP packets. If the current user interface data was previously received by the client, then the server stops transmitting data to the client until the user interface data has changed. Whereas, if the current user interface data has not been previously received by the client, then the server transmits the current user interface data in a lossy compression format using fewer IP packets than the previous transmission. In certain situations in which the current user interface data was not previously received by the client, the server transmits the current user interface data in a lossy compression format using only a single IP packet to ensure that the data arrives at the client and can be rendered in the minimum time possible, in order to avoid, or at least minimize, any lag perceived by the user. The client device renders 611 the received data and initiates low power state 612 between transmissions.

Figure 16:
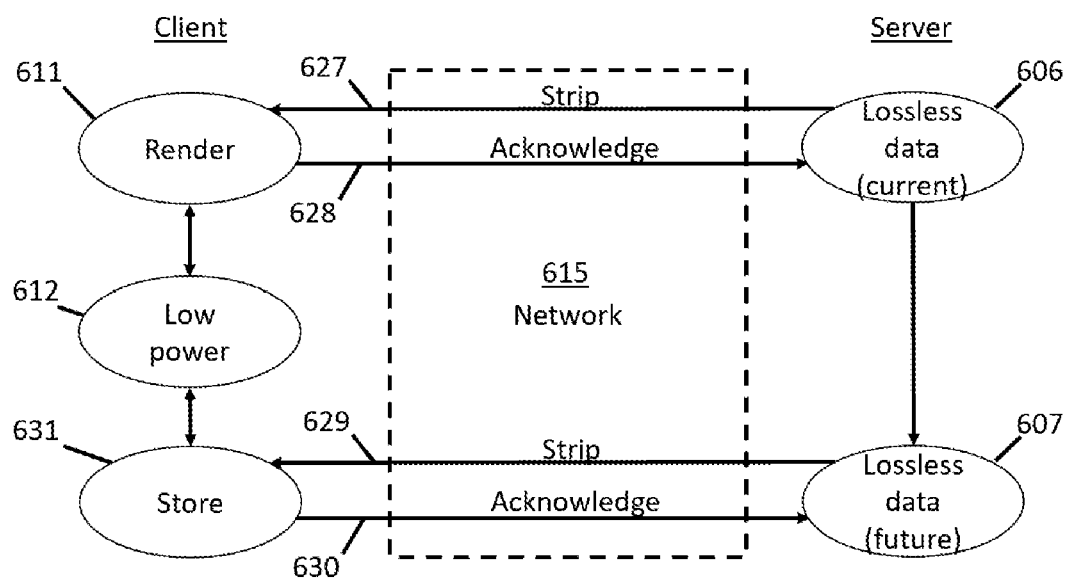

Reference is made to FIG. 16, showing server states 606 and 607 and client states 611, 612 and 631 that handle user interface data in a lossless commission format, in accordance with an embodiment of the present invention. The server sends user interface data in a lossless compression format after previously sending the same data in a lossy commission format, as the time required to send the user interface data in a lossless compression format would necessarily cause the user to experience a lag. The lossless compressed data removes compression artifacts that may be visible to the user in the lossy compressed data, in particular when the same lossy compressed data remains on the display for a threshold time interval.

When transmitting user interface data in a lossless compression format, the server divides the user interface data into segments, and transmits each segment of the user interface data as a separate transmission. This enables the client to perform a partial refresh operation, namely, to refresh only an area of the client display corresponding to one or more of the transmitted segments. In some cases the segments are strips of user interface data. In some cases the server divides the user interface data into four strips.

At state 606 the server divides the user interface data into a number of segments and transmits 627 each segment over network 615, to the client where that segment is rendered 611. After each segment is received, the client sends 628 an acknowledge signal to the server over network 615. As discussed hereinabove, the client device initiates a state of low power consumption 612 between transmissions.

After all segments of user interface data have been transmitted in the lossless commission format, and the user interface remains unchanged, the server proceeds to transmit segments of additional user interface data that will be required on the client device in response to an anticipated scroll command on the client device. The objective of these additional transmissions is to enable the client to respond, without any lag, to a scroll command entered by the user in situations where, due to traffic on network 615, the scroll command cannot be transmitted to the server. However, if the scroll command is transmitted to the server and the server sends changed user interface data to the client in response to the scroll command, the client will use the lossy compressed data sent by the server rather than the lossless data stored on the client device, as it is important for the user experience that the data on the client device match the data on the server.

At server state 607, the server identifies additional user interface data that will be required on the client device in response to an anticipated scroll command and transmits 629 the identified additional user interface data to the client, as lossless compressed data, over network 615. At client state 631, the client stores this additional user interface data and transmits 630 an acknowledge signal to the server over network 615 to indicate that all IP packets containing the segment of additional user interface data have been successfully received by the client.

Figure 17:
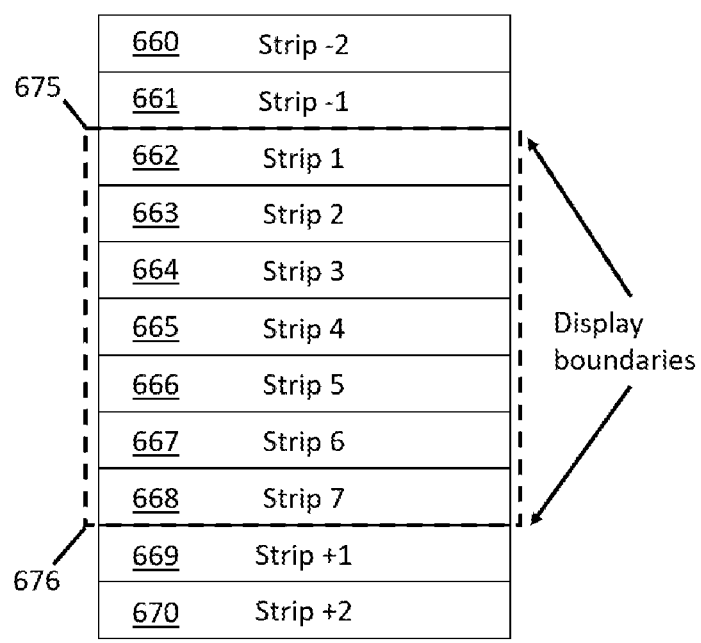
FIG. 17 is a simplified illustration of a user interface divided into strips, in accordance with an embodiment of the present invention.

Reference is made to FIG. 17, illustrating a user interface divided into strips, in accordance with an embodiment of the present invention. As discussed hereinabove, this division into strips is performed when transmitting user interface data in a lossless compression format. FIG. 16 shows the current user interface data to be rendered on the client display as strips 1-7, i.e., elements 662-668, that span the area between the display's upper and lower boundaries 675 and 676, respectively. FIG. 17 also shows additional user interface data that will be required on the client device in response to anticipated scroll commands on the client device: strips −1 and −2, i.e., elements 660 and 661, respectively, will be required for a downward scroll operation, and strips +1 and +2, i.e., elements 669 and 670, respectively, will be required for an upward scroll operation.

Figure 18:
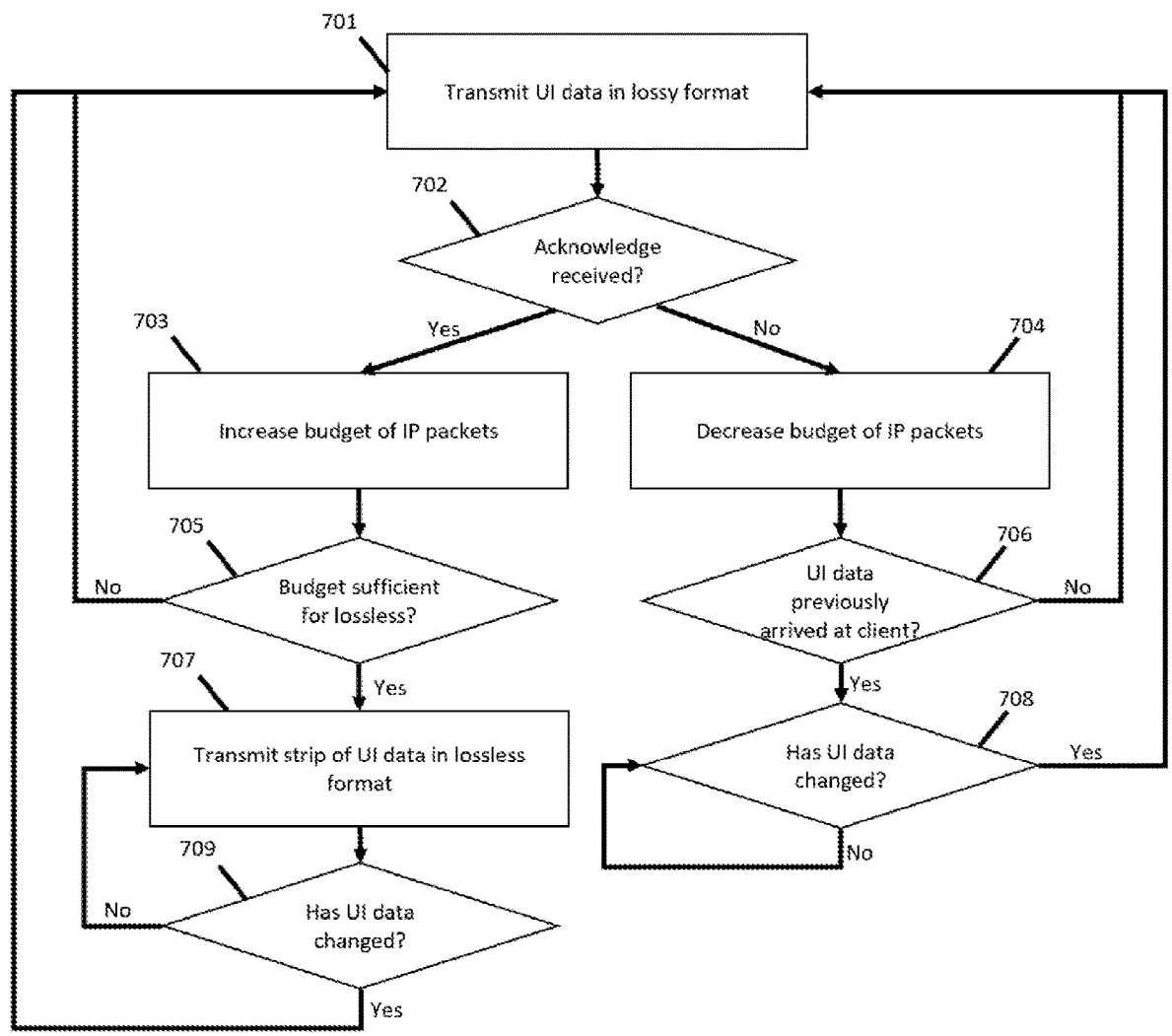
FIG. 18 is a flowchart for a server streaming user interface data to a client, in accordance with an embodiment of the present invention.

Reference is made to FIG. 18, which is a flowchart of a method for streaming user interface data from a server to a client, in accordance with an embodiment of the present invention. At step 701, the server transmits lossy user interface data over a network to a client device. The next operation by the server depends on whether the server receives an acknowledge signal from the client that all IP packets in the transmission at step 701 arrived at the client. If, at step 702, the server determines that the acknowledge signal was received, then at step 703 the server increases the budget of IP packets for the next transmission, when the network parameters allow such an increase.

After increasing the budget of IP packets, the server determines, at step 705, whether the increased budget is sufficient to retransmit the user interface data in a lossless compression format. If the increased budget is insufficient, the server returns to step 701 and compresses the user interface data at a higher quality than before using the increased IP packet budget.

When the increased budget is sufficient to retransmit the current user interface data in a lossless compression format, the server proceeds to step 707, to divide the current user interface data into segments and transmit each segment as lossless compressed data.

After transmitting each segment, the server monitors, at step 709, whether the user interface data has changed. When the server detects that the user interface data has changed, the process returns to step 701 to minimize lag by transmitting the new user interface data in the lossy compression format.

If, at step 702, the server determines that the acknowledge signal was not received, then at step 704 the server decreases the budget of IP packets for the next transmission, if the number of IP packets in the previous transmission was greater than one IP packet. After decreasing the budget of IP packets, the server determines, at step 706, whether the failed transmission of user interface data contained data that was previously received by the client, e.g., the previous transmission was a retransmission of user interface data using an increased IP packet budget as per step 703. In that case, there is no need to resend that data to the client using fewer IP packets as the client will continue to present the last image of lossy user interface data until new data arrives. The method proceeds to step 708, where the server monitors whether the user interface data has changed, in the same way as described hereinabove at step 709. When the server detects that the user interface data has changed, the process returns to step 701, where the server transmits the changed user interface data in a lossy compression format.

If, however, at step 706, the server determines that the failed transmission of user interface data contained data that was not previously successfully transmitted to the client, the server returns to step 701 and reencodes the user interface data using the reduced IP packet budget of step 704. In certain cases, the IP packet budget is reduced at step 704 to a single packet in order to ensure that the user interface data is presented on the client display as quickly as possible and thus avoid any sense of lag for the user. The server then gradually raises the IP packet budget repeating the sequence of steps 701, 702, 703 and 705.

Figure 19:
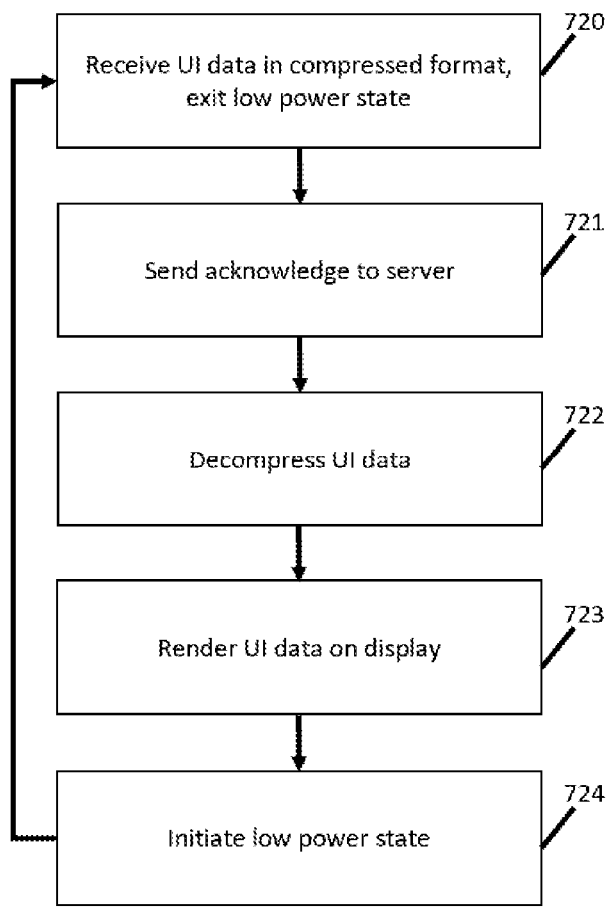
FIG. 19 is a flowchart for a client device receiving user interface data from a server, in accordance with an embodiment of the present invention.

Reference is made to FIG. 19, which is a flowchart of a method for receiving user interface data by a client, from a server, in accordance with an embodiment of the present invention. As mentioned hereinabove, the client initiates a low power state between transmissions of user interface data. Upon receiving a transmission of user interface data from the server, the client, at step 720, exits the low power state. At step 721, the client transmits an acknowledge signal to the server, over the wireless network, acknowledging that the transmission was successfully received. At step 722, the client decompresses the received data, and at step 723 the client renders the user interface data on a display. Non-image user interface data such as audio and haptics are sent to an appropriate output device. As discussed hereinabove, the transmission time and decode time are used by the server to throttle the number of IP packets in subsequent transmissions up or down. In order to facilitate this calculation, the client transmits timestamps when data are received to enable the server to calculate the transmission time. At step 724, the client initiates a low power state until new data arrives at step 720. Even when no new data is sent by the server, the client sends periodic acknowledge signals to the server to maintain the connection with the server over the wireless network.

Figure 20:
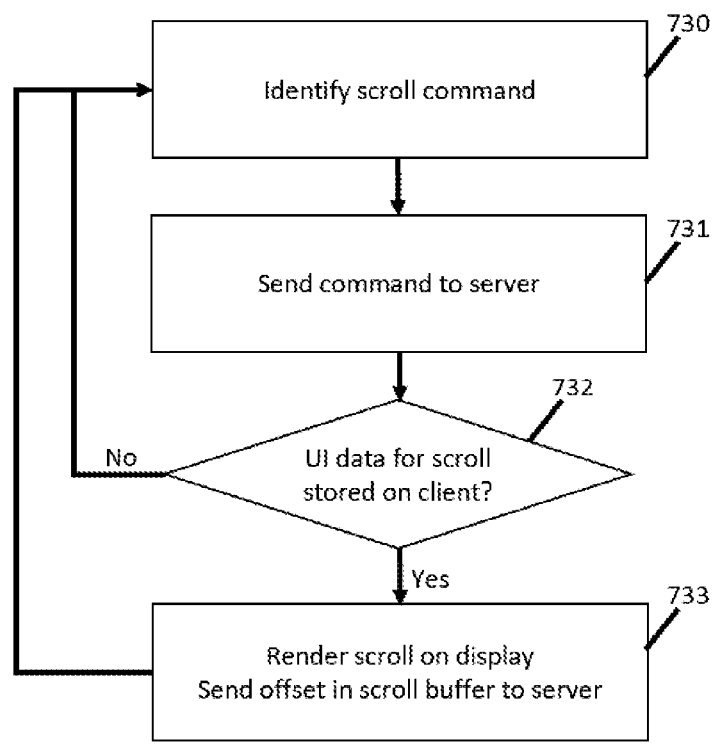
FIG. 20 is a flowchart for processing a scroll command on a client device, in accordance with an embodiment of the present invention.

Reference is made to FIG. 20, which is a flowchart of a method for a client to process a scroll command, in accordance with an embodiment of the present invention. This method addresses scenarios when the cellular network connection between the server and the client is broken after the lossless data arrived at the client device. In this case, it would be desirable to enable the client to react to user inputs without betraying to the user that the wireless network connection between server and client is broken. In order to enable this, after the server has finished sending all segments of the current user interface data in lossless compression format, the server identifies additional user interface data that will be required on the client device in response to an anticipated command. Thus, the server artificially pans and scrolls the application in order to obtain the panned and scrolled frames that would be required if the user were to enter a pan or scroll command, e.g., user interface data that is virtually present beyond the edges of the user interface data presented on the client device.

The server transmits this identified additional user interface data in a lossless compression format for the client to append it to the current user interface data. In the event that the wireless network connection is then broken, and the user enters the anticipated scroll command on the client device, the client is still able to perform the pan or scroll using the additional user interface data. The pan or scroll offset is sent to the server (when the network communication allows) to ensure that the client device is in synch with the application on the server. Thus, at step 730, the client device identifies a scroll command entered by the user, e.g., a vertical glide gesture along the height of the client touchscreen. At step 731, the client transmits this command to the server over the network. The client determines, at step 732, whether data for the scroll command resides on the client device. If the data resides on the client, then at step 733 the client executes the scroll operation on the client display and sends the offset that was scrolled to the server in order for the server to sync with the scroll operation on the client device. If the data does not reside on the client device, the client waits for updated user interface data from the server and returns to step 730 to monitor for user input.

Figure 21:
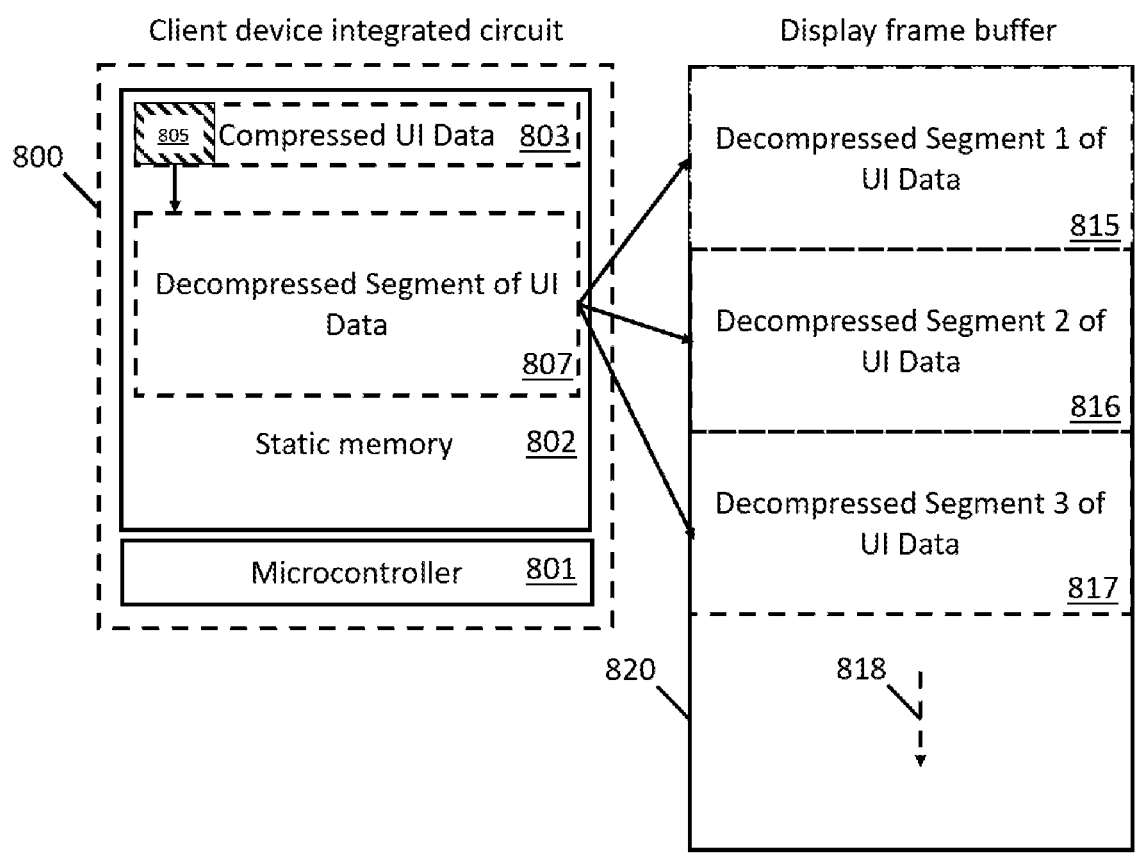
FIG. 21 is a simplified illustration of a client device processing user interface data, in accordance with an embodiment of the present invention.

Reference is made to FIG. 21 illustrating a client device processing user interface data, in accordance with an embodiment of the present invention. In embodiments of the invention, the client device cost is minimized by limiting the amount of static memory on the client device, and battery usage is minimized by minimizing the number of data transfers between static memory and dynamic memory. The size of the static memory on the client microcontroller integrated circuit is not large enough to enable the client device to decompress and store an entire display frame. Therefore, the client device divides a frame into segments and decompresses each segment separately. Each decompressed segment is copied to a dynamic memory frame buffer before the next segment is decompressed.

FIG. 21 shows client device integrated circuit 800, featuring microcontroller 801 and static memory 802. An entire transmission of compressed user interface data received from the server is stored in section 803 of static memory 802. Microcontroller 801 decompresses a portion 805 of the compressed user interface data, creating segment 807 of decompressed user interface data in static memory 802 without sending data out of static memory 802, minimizing power consumption on the client device. Integrated circuit 800 copies segment 807 of decompressed user interface data to dynamic memory display frame buffer 820, e.g., as one of segments 815-817, and then proceeds to decompress additional segments of the received compressed data. The client display is refreshed line by line from frame buffer 820, and the client device copies the decompressed UI data to display frame buffer 820 after the corresponding rows have been refreshed on the display, such that new rows of frame data are updated to buffer 820 in sync with the display refresh operations. When, due to network load or other reasons, data for new frames arrive at a rate that is slower than the display refresh rate, display frame buffer 820 is refreshed at a reduced rate while ensuring that each row is updated in sync with the display refresh, in order to avoid artifacts due to mixing rows of different frames. Artifacts due to mixing rows from different frames are more noticeable than a reduced refresh rate on the display.

Figure 22:
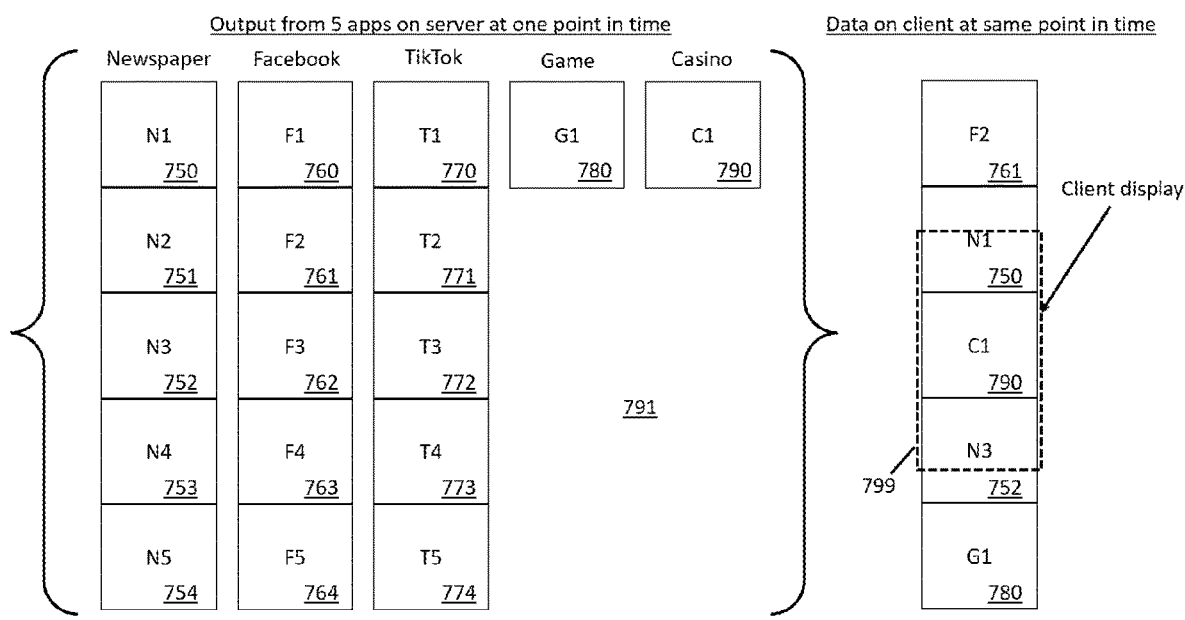
FIG. 22 is a simplified illustration of user interface data from multiple user applications, on a server and on a client, in accordance with an embodiment of the present invention.

Reference is made to FIG. 22 which is a simplified illustration of user interface data from multiple user applications, on a server and on a client, in accordance with an embodiment of the present invention. As discussed hereinabove, a server runs multiple applications for a user of a client device, where the client and server communicate over a wireless network. In FIG. 22, memory 791 is located on the server and stores the current user interface state for five applications: a newspaper, Facebook®, TikTok®, a video game and a casino game. Facebook is a registered trademark of Facebook Inc. Tiktok is a registered trademark of Bytedance Ltd. At the given point in time, the newspaper app has five articles, N1-N5, indicated as elements 750-754, respectively, stretched out as a long strip, of which only a portion fits on the client display. Similarly, the Facebook application has five social media posts, F1-F5, indicated as elements 760-764, respectively, and the TikTok application has five music videos, T1-T5, indicated as elements 770-774, respectively. Each of these series is stretched out as a long strip that could be scrolled through by the user. Any video, at the given moment in time is a still image of that video at that moment in time. The server also runs a video game, having a video screen G1, indicated as element 780, and a casino game having a graphical user interface C1, indicated as element 790. The server combines portions of these different user applications into a feed that it sends to the client over the wireless network. FIG. 22 shows this feed for the client containing Facebook post F2, indicated as element 761, newspaper item N1, indicated as element 750, the user interface C1 of the user's casino play at that time, represented as element 790, newspaper item N3, indicated as element 752, and the user interface G1 of the user's game play at that time, represented as element 780. Only a portion of this assembled feed fits within client display 799. This feed is stored on the server, and that portion of the feed that is to be seen on the client display is sent to the client over the wireless network.

The server, however, stores a larger feed than the client. Namely, portions of the client feed outside the boundaries of the client display, such as the upper portion of article N1 indicated as element 750 and the user interface G1 of the user's game play at that time, represented as element 780, are stored on the server, but are not sent to the client. The user scrolls the application feed to see elements virtually located outside the display. That is, the user enters a scroll command on the client device, which is relayed back to the server. In response, the server scrolls the application whereby a different portion of the feed is within the display window. The server sends user interface data in the display window to the client. In applications where the feed is continuously, dynamically updated on the server, e.g., social media apps that continually upload new data from other users, the scrolled data is often different than the data at the scrolled location at a time prior to the scroll operation.

In certain situations, the scroll command does not replace all of the data in the client display window. For example, the user feed remains unchanged since the previous transmission to the client, and the scroll command translates the feed upward less than the length of the client display. That is, the lower portion of the client display is shifted upward on the display, and data virtually located below the display is shifted into the display. In this case, the server sends parameters for shifting the bottom portion of the display upward, but not the actual shifted data as that data already resides on the client. The server also sends the new data shifted up into the display to the client.

As discussed hereinabove regarding FIG. 17, under certain circumstances, the server transmits user interface data in the feed that resides outside the client display window to the client in a lossless compression format. The purpose of this transmission is to enable the client to respond to a scroll command when communication with the server is suspended.

Figure 23:
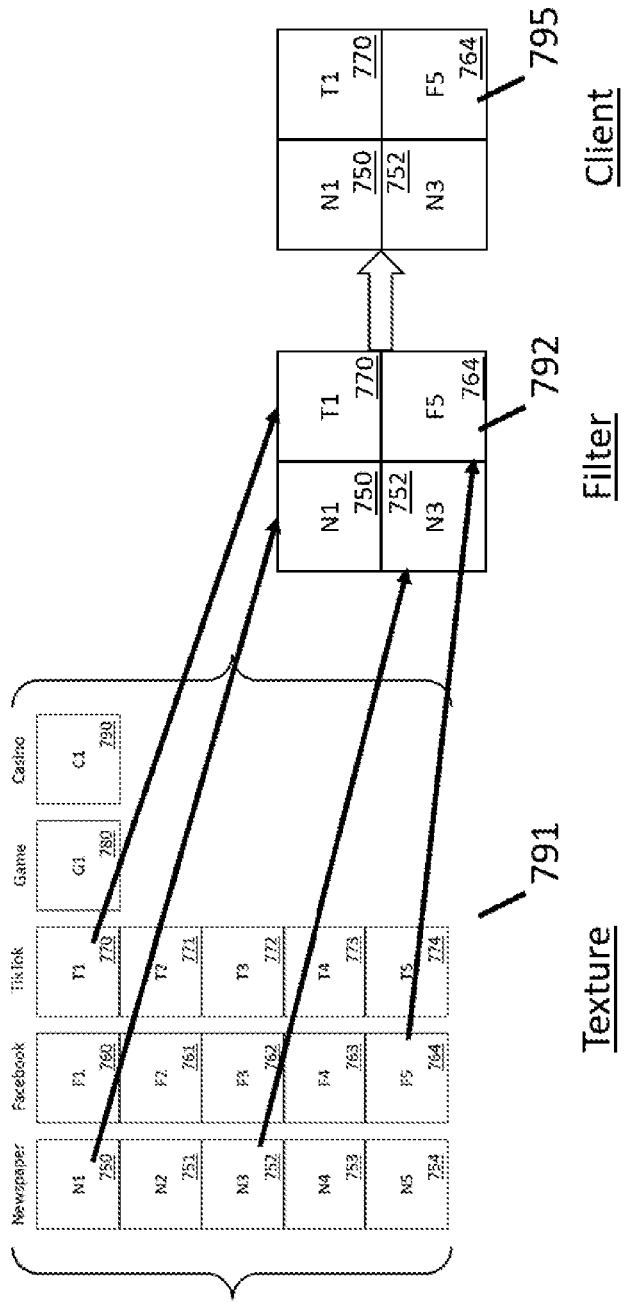
FIGS. 23 and 24 are simplified illustrations of filter operations performed by a server on user interface data, in accordance with an embodiment of the present invention.

Reference is made to FIG. 23 illustrating filter operations performed by a server on user interface data, in accordance with an embodiment of the present invention. Three memories are depicted in FIG. 23: memory 791 represents the outputs from all applications running on the server on behalf of a specific client. As discussed hereinabove with reference to FIG. 13, these outputs are stored in a shared memory as a texture. The server performs filter operations on the data in this texture. In FIG. 23, portions 750, 752, 764 and 770, i.e., segments N1 and N3 from the newspaper application, segment F5 from the Facebook application and segment T1 from the TikTok application are assembled by the filter operation and stored on the server as filter output 792. This filter output is transmitted to the client device over the wireless network. The data on the client device is indicated as element 795. The filter operations use criteria provided by the user in order to determine what to include in the client feed. For example, the user defines criteria, and the filter operation selects segments from each running application that contain data that match the criteria.

Figure 24:
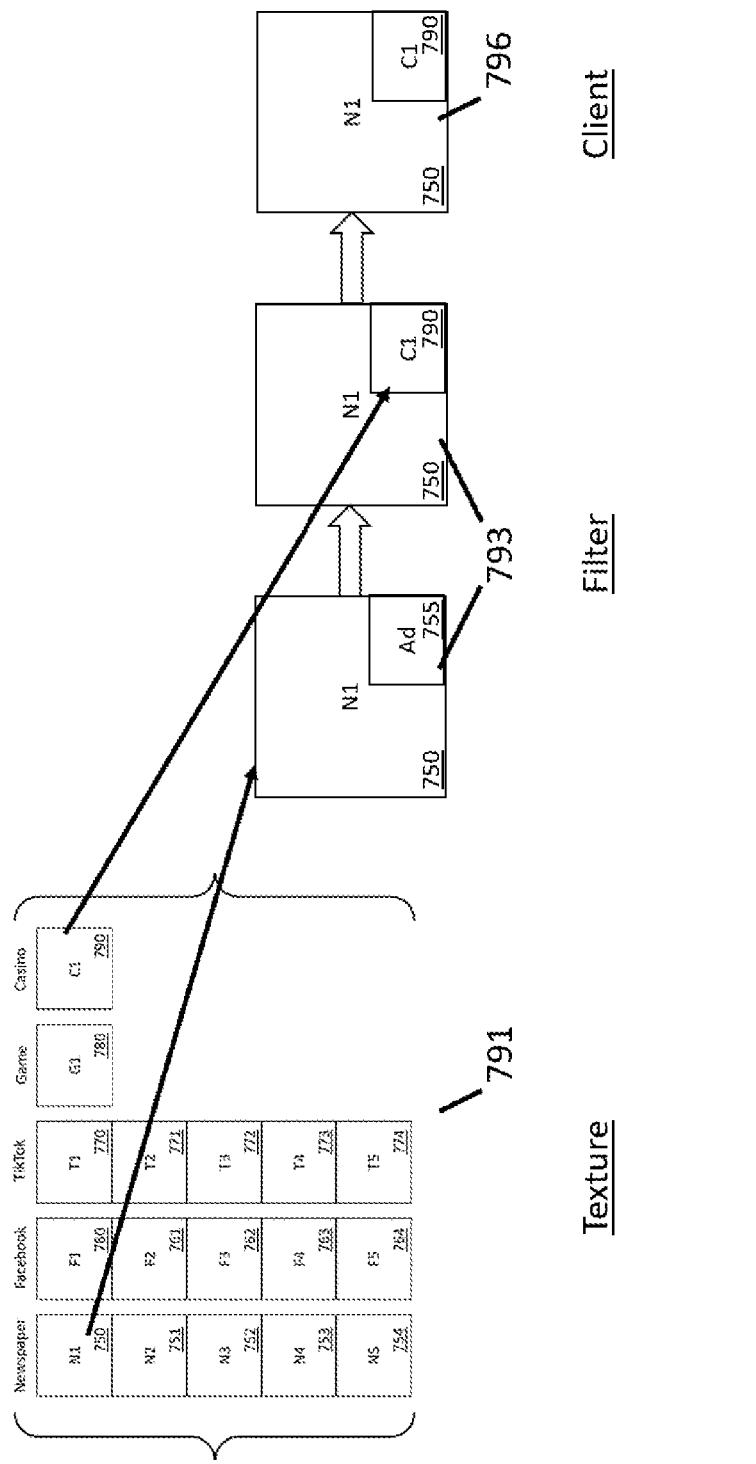

Reference is made to FIG. 24 illustrating filter operations performed by a server on user interface data, in accordance with an embodiment of the present invention. Three memories are depicted in FIG. 24: memory 791 represents the outputs from all applications running on the server on behalf of a specific client. As discussed hereinabove, these outputs are stored in a shared memory as a texture. The filter operations are performed on data indicated as element 793. The filter identifies segment N1 from the newspaper application as containing data relevant to the client based on the filter criteria. Segment N1 is indicated as element 750. The filter analyzes this segment and identifies advertisement 755 within the segment. The filter criteria indicate that the user would prefer to remove advertisements inserted by the publisher of the newspaper application and replace them with user interface data C1 for an interactive casino game application, indicated as element 790. Thus, the filter operation resizes interactive casino game application 790 to fit within the area allocated to advertisement 755 and replaces advertisement 755 with the current user interface for interactive casino game application 790. The final filter output is transmitted to the client, indicated by client memory 796. In one use case, these filter operations are managed by a cellular network provider, who can thereby replace advertisements in user applications with advertisements or other promotional content selected by the cellular network provider.

Reference is made to FIGS. 25 and 26, which are simplified illustrations of a scroll operation on a dumb terminal client device, in accordance with an embodiment of the invention. FIG. 25 illustrates personal communication unit 13, presenting a plurality of windows 241-244 on a display, wherein each window shows a live stream from a corresponding user application. FIG. 26 illustrates a scroll gesture 412 by finger 401 gliding upwards along the height of the display. In response to this gesture, the window frames do not move, but the contents of all four windows 241-244 scroll in parallel. In this embodiment, the contents of windows 241-244 scroll even though the gesture touches only window 243. A scroll gesture in any of the windows thus scrolls the content inside all windows in parallel.

Reference is made to FIG. 27, which is a simplified illustration of a home screen user interface on a dumb terminal client device, in accordance with an embodiment of the invention. FIG. 27 illustrates a home screen on dumb terminal client device 13, featuring a plurality of icons 245, representing a corresponding plurality of user applications. The home screen is actually running on the server; the image of the home screen is sent to dumb terminal client device 13. A tap gesture on the dumb terminal client device 13 display is detected, e.g., by a touchscreen sensor, and transmitted to the server. The server edge application maps the coordinates of the tap gesture to an icon at the tap gesture location and begins to send the user interface for the corresponding application to dumb terminal client device 13. When additional user applications are available to be selected from the home screen, but their icons don't fit on the display, the user scrolls the display to reveal the additional icons. That is, the scroll gesture is transmitted to the server, which scrolls the home screen and sends images of the scrolled home screen to dumb terminal client device 13. FIG. 27 illustrates one user application being selected by finger 401 tapping on icon 246.

Figure 28:
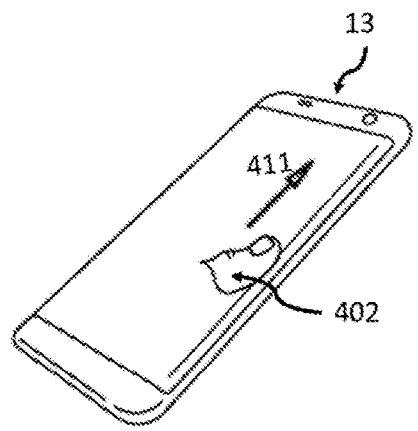
Figure 29:
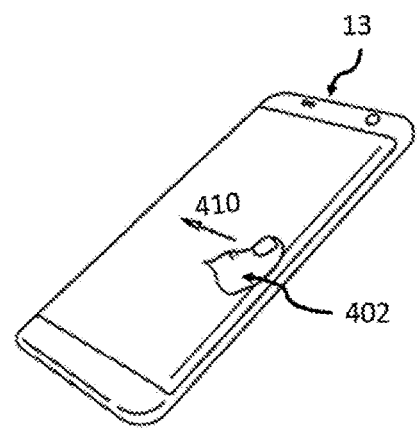

Reference is made to FIGS. 28 and 29 which are simplified illustrations of user interface gestures for navigating within, and between, applications on a dumb terminal client device, in accordance with an embodiment of the invention. FIG. 28 shows thumb 402 performing vertical swipe gesture 411 on the touchscreen of dumb terminal client device 13 to scroll within a selected user application. FIG. 29 shows thumb 402 performing horizontal swipe gesture 410 on the touchscreen of dumb terminal client device 13 to change the selected application from the current selected application to a next user application from among the available user applications on the device. Thus, for example, if the user has access to a number of social media apps, when a first app has been selected by the user, the user swipes up/down to scroll through the app feed. When the user swipes left, the user's feed from a second social media app is shown on the display, and the user now swipes up/down to scroll through that second feed. If the user swipes right, the first app returns to the display. The user interface for switching active applications is analogous to flipping television channels, e.g., a different application is selected as the active application in response to horizontal swipe gesture 410 on the dumb terminal client device display.

In other embodiments of the invention, horizontal swipe gestures pan the user interface data on the display to the left and to the right, and the gesture for switching between applications is a diagonal swipe gesture upwards and to the right along the display. Another gesture, e.g., a diagonal swipe gesture upwards and to the left along the display opens a touch keyboard. Other gestures for switching between applications and for performing other tasks are also within the scope of the invention.

Note that all of the user's social media apps have been running all the while on the application server, even while only one of those feeds is shown on the display. Typically, a user will have access, via a 5G network provider or other subscription-based service, to a variety of user applications, and the principle of operation remains the same, namely a first set of user interface gestures is used for navigating within the user application currently on the dumb terminal client device display, and a second set of user interface gestures is used for navigating between different user applications. Each time a different user application is selected, dumb terminal client device 13 receives a stream of screen images for the selected application from the application server running that user application and stops receiving the stream of screen images for the previously selected application.

In embodiments of the invention, different users share the same dumb terminal client device, whereby the dumb terminal client device switches between different users by connecting to the particular server running applications for a selected user. A security breach affecting one user will not affect the other user, as user application data is not stored on the shared dumb terminal client device. For example, an individual maintains two separate user accounts: a personal account and a business account. The individual switches between the two user accounts on their dumb terminal client device configured as a mobile phone, smartwatch or tablet. Each user account has a separate set of registered applications. There is no possibility of leaking data between different users, as each user's applications run on a respective, different server. Similarly, different family members can share a single dumb terminal client device and switch users without the risk that one user will compromise the security of any of the other users. In yet another use case, hotels and gyms provide user equipment to patrons that use the equipment for a limited amount of time to connect to their own user accounts on their application servers and access their own set of user applications. The patron's experience is the same as when he uses his own user equipment.

Figure 30:
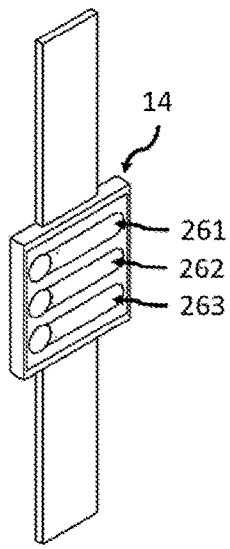
FIGS. 30-32 are simplified illustrations of a user interface for selecting a user on a dumb terminal client device configured as an electronic watch, in accordance with an embodiment of the present invention.
Figure 31:
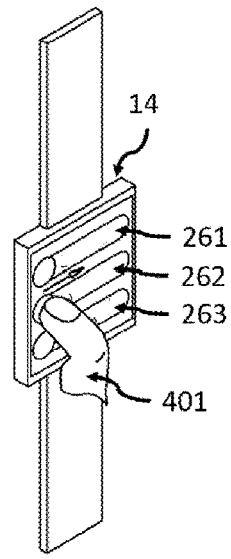
Figure 32:
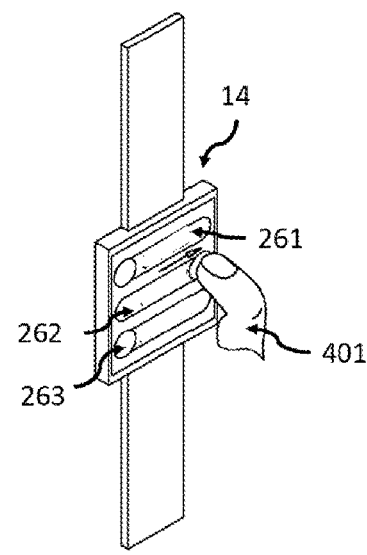

Reference is made to FIGS. 30-32 which are simplified illustrations of a user interface for selecting a user on a dumb terminal client device configured as an electronic watch, in accordance with an embodiment of the invention. Dumb terminal client device 14 is configured as an electronic watch and presents three toggle switches 261-263 on its touchscreen, each toggle switch corresponding to a unique user account having access to a corresponding set of user applications. FIGS. 31 and 32 illustrate finger 401 performing a gesture to activate the user profile corresponding to toggle switch 262 by sliding the button inside toggle switch 262 from left, in FIG. 31, to right in FIG. 32.

Figure 33:
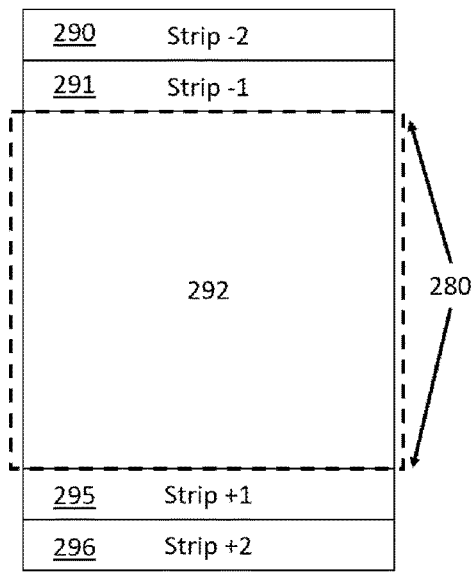
FIGS. 33 and 34 are simplified illustrations of a scroll function on a dumb terminal client device, in accordance with an embodiment of the present invention.
Figure 34:
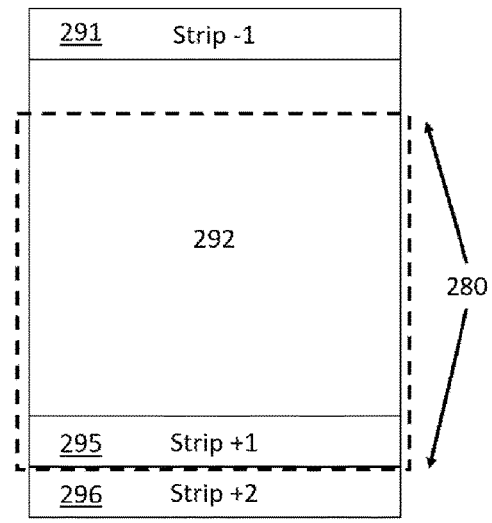

Reference is made to FIGS. 33 and 34, which are simplified illustrations of a scroll function on a dumb terminal client device, in accordance with an embodiment of the present invention. FIG. 33 illustrates a first state where an application user interface includes portions 290-296, but only portion 292 is viewable on display 280. A scroll command to translate the user interface upwards, entered by the user on the dumb terminal client device is transmitted to the server running the application. In response to this command, the portions to be rendered on the display are the bottom portion of 292 and portion 295, as illustrated in FIG. 33. In this case, the server compresses only the additional portion of the feed that hasn't yet been transmitted to the dumb terminal client device, that is, only portion 295. The server also transmits a command to translate the previous frame upward and to append portion 295 to the bottom portion of the frame, as illustrated in FIG. 34.

Figure 35:
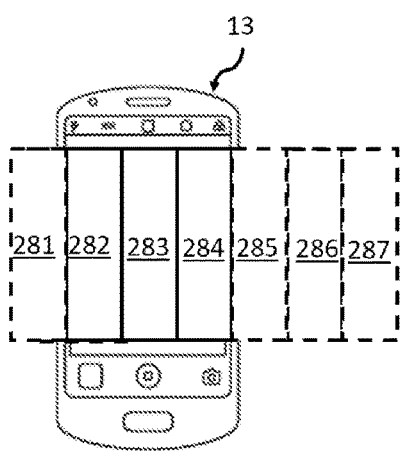
FIGS. 35 and 36 are simplified illustrations of a pan function on a dumb terminal client device, in accordance with an embodiment of the present invention.
Figure 36:
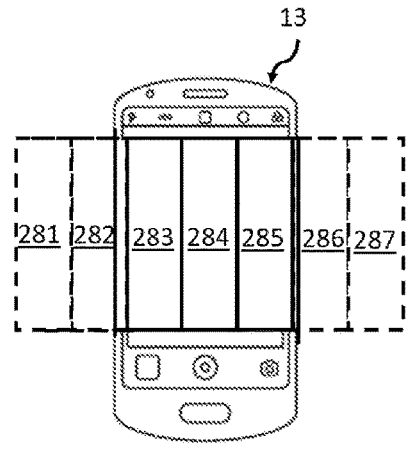

Reference is made to FIGS. 35 and 36, which are simplified illustrations of a pan function on a dumb terminal client device, in accordance with an embodiment of the present invention. FIG. 35 illustrates a first state where an application user interface includes portions 281-287, but only portions 282-284 are viewable on the display. A pan command to translate the feed sideways, entered by the user on dumb terminal client device 13 is transmitted to the server running the application. In response to this pan command, the portions to be rendered on the display are portions of 283-285 as illustrated in FIG. 36. In this case, the server compresses only the additional portion of the feed that hasn't yet been transmitted to dumb terminal client device 13, that is, only portion 285. The server also transmits a command to translate the image in the frame buffer to the left and to append portion 285 to the right edge of the frame buffer, as illustrated in FIG. 36.

Figure 37:
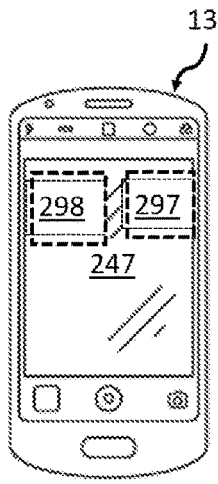
FIG. 37 is a simplified illustration of a user interface on a dumb terminal client device, in accordance with an embodiment of the present invention.
Figure 38:
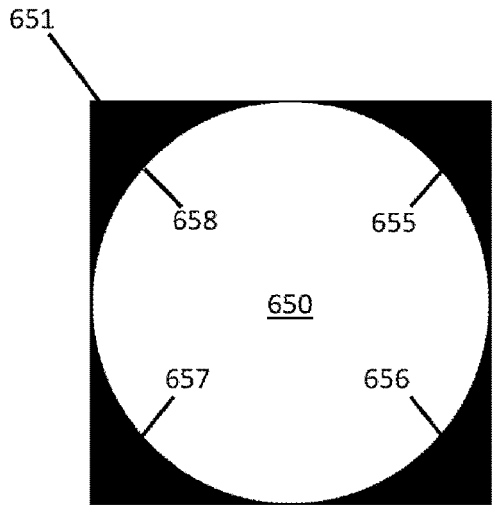
FIG. 38 is a simplified illustration of user interface data adapted for a circular display, in accordance with an embodiment of the present invention.

Reference is made to FIG. 37, which is a simplified illustration of a user interface on a dumb terminal client device, in accordance with an embodiment of the present invention, FIG. 38 shows user interface 247 on dumb terminal client device 13. Only regions 297 and 298 have been modified in user interface 247 by the application. In this case, the server sends only modified regions 297 and 298 to dumb terminal client device 13. In certain embodiments of the invention, the server identifies a bounding box surrounding all of the modified regions and sends only the data inside the bounding box. For example, in the example illustrated in FIG. 37, the server creates a bounding box surrounding regions 297 and 298 and encodes the region enclosed by the bounding box. If the user interface screen does not change between frames, the server does not send a new frame but rather communicates to dumb terminal client device 13 that the current frame should be reused for the next frame. These methods are better than standard video compression, where each new frame is rendered and written to the display buffer, even if there is no change between frames. In contrast, in embodiments of the present invention, unchanged portions of the application user interface are reused in the frame buffer.

In certain embodiments of the invention, the server determines whether any portions of a current output frame are already present in a memory on the dumb terminal client device, e.g., the same portion has already been transmitted in an earlier frame. Only frames, or portions of frames, that are not already present in a memory on the dumb terminal client device are compressed and sent by the server.

In order to further minimize lag between frames, the dumb terminal client device stores decompressed image data to a directly viewable image buffer, whereby, when a series of unchanged frames is to be presented on the display, each frame in the series is not copied into the display image buffer between frames. Rather, a single image remains in the viewable buffer as long as the user interface data remains unchanged.

Similarly, when only a portion of each new frame differs from the previous frame, only the changed portion of the frame is written to the image buffer. This method contrasts with video streaming, whereby each new frame is copied to the display buffer, even when the new frame is no different than the previous frame.

Reference is made to FIG. 38 illustrating a user interface adapted for a circular display, in accordance with an embodiment of the present invention. The user interface data is composed of rectangular blocks of data that are compressed. However, as FIG. 38 illustrates, when the client display is circular, user interface data 651 includes a central, circular portion 650 that is presented on the client display, and corners 655-658 that are not presented on the client display.

In order to reduce the amount of data transmitted over the wireless network, the server overwrites areas 655-658 of the user interface with a single, solid fill, that is compressed using fewer bits than would have been required to compress the more complex data in areas 655-658 of the user interface.

Figure 39:
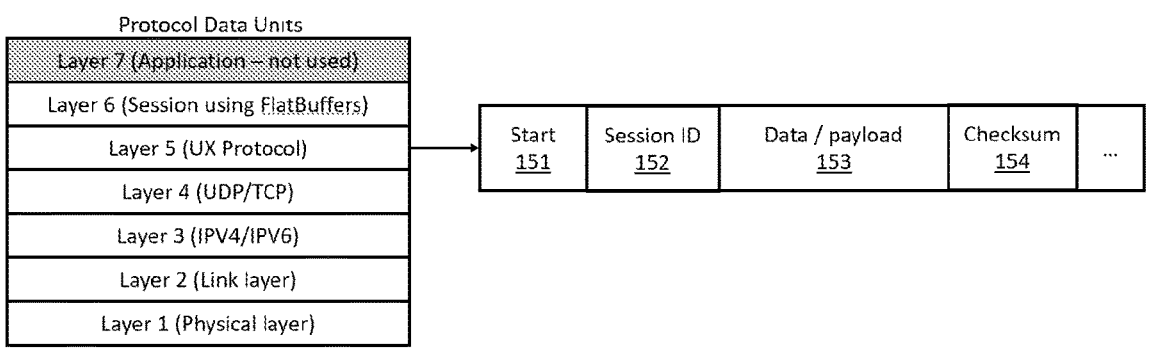
FIG. 39 is a simplified illustration of protocol data units, in accordance with an embodiment of the invention.

Reference is made to FIG. 39, illustrating protocol data units, in accordance with an embodiment of the invention. The protocol data has seven levels corresponding to the seven-layer OSI model of computer networking. Levels 1-4 of the protocol data units are managed by the network and level 5 is used for transmitting user interface data from the server to the client and for transmitting user input gathered by sensors on the client device to the server. In certain embodiments of the invention, a supervisor server 125, discussed hereinabove with regard to FIG. 4, assigns a unique session ID to each session, and this session ID can be used to ensure that only an authorized client will access its application running on the server. Accordingly, the session ID is incorporated in the application data traffic, which belongs to Level 5 in the OSI model. A Level 5 transmission includes start field 151, session ID 152, payload 153 and a checksum field 154. In certain embodiments of the invention, payload 153 is encrypted in accordance with an encryption protocol, such as secure sockets layer (SSL), and session ID 152 is replaced by the corresponding encryption key.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A client-server architecture method for providing interactive dumb terminal applications through a wireless communication system to a plurality of portable electronic devices, comprising:

provide a server computer running an operating system;

configure, by the server computer, a display timing parameter for the operating system;

communicatively connect the provided server computer with a plurality of portable electronic devices over a wireless communication system, each device comprising a wireless transceiver and operable to decompress incoming compressed data streamed via the wireless communication system, wherein the provided server computer continually monitors bandwidth of each communicative connection to each of the devices;

run, by the server computer, a plurality of applications in parallel, each application being run on behalf of a corresponding one of the connected devices, each application being configured to generate output in accordance with the configured display timing parameter;

run, by the server computer, an edge application, configured to select data from the application outputs and to selectively transmit the selected data in a compressed format to respective ones of the connected devices over the wireless communication system, wherein a frequency of transmission to each device is dynamically throttled up or down by the edge application in accordance with changes in the monitored bandwidth of the communicative connection to that device; and decompress the selected data, by each connected device to which selected data was transmitted.

2. The client-server architecture method of claim 1, wherein the outputs generated by the plurality of applications are bitmaps, and wherein each of the connected devices further comprises a display and is further operable to render its decompressed bitmaps on its display.

3. The client-server architecture method of claim 2, wherein the edge application is configured to identify sponsored content in the bitmaps selected from the application outputs and to selectively remove the identified sponsored content prior to selectively transmitting the selected bitmaps in a compressed format to respective ones of the connected devices.

4. The client-server architecture method of claim 3, wherein the edge application replaces the identified sponsored content with other content prior to selectively transmitting the selected bitmaps in a compressed format to respective ones of the connected devices.

5. The client-server architecture method of claim 4, wherein the plurality of applications comprise multiple applications running on behalf of each of the connected devices, and wherein sponsored content identified in output from one application is replaced with output from another application running on behalf of the same connected device.

6. The client-server architecture method of claim 2, wherein the edge application is configured to perform optical character recognition (OCR) on the bitmaps selected from the application outputs.

7. The client-server architecture method of claim 2, wherein the configured operating system display timing parameter is less than or equal to half a display timing for the displays on each of the connected devices in order that the running applications generate output at a rate that is at least twice a refresh rate of each of the connected device displays.

8. The client-server architecture method of claim 7, wherein the connected devices are electronic watches and mobile phones.

9. The client-server architecture method of claim 2, wherein the plurality of applications comprise two or more applications running on behalf of a single one of the connected devices.

10. The client-server architecture method of claim 9, wherein the edge application combines outputs from the two or more applications and transmits the combined output in a compressed format to the single one of the connected devices over the wireless communication system.

11. The client-server architecture method of claim 9, wherein the single one of the connected devices further comprises at least one sensor operable to generate input, and is further operable to transmit the generated input to the edge application over the wireless communication system,
wherein the edge application selects one of the two or more applications as an active application for the single one of the connected devices and transmits output data from the active application in a compressed format to the single one of the connected devices over the wireless communication system,
and wherein, in response to certain input received from the single one of the connected devices the edge application selects a different one of the two or more applications as the active application for the single one of the connected devices.

12. The client-server architecture method of claim 11, wherein the at least one sensor is a touchscreen and the certain input is a directional swipe gesture performed entirely inside an area of the touchscreen on which the active application is presented.

13. The client-server architecture method of claim 11, wherein the at least one sensor is a proximity sensor and the certain input is an in-air directional swipe gesture above and across the display.

14. The client-server architecture method of claim 1, wherein each of the connected devices further comprises at least one sensor operable to generate input, and is further operable to transmit the generated input to the edge application over the wireless communication system, and wherein the edge application directs the input from each device to its corresponding application.

15. The client-server architecture method of claim 14, wherein the edge application validates inputs received over the wireless communication system to prevent invalid and malicious input from reaching the plurality of applications.

16. The client-server architecture method of claim 14, wherein the edge application translates the input from each device in accordance with a command dictionary configured for each application-device pair comprising the device that generated the input and the application whose output was sent to that device.

17. The client-server architecture method of claim 14, wherein the at least one sensor is a camera, and wherein the edge application analyzes images captured by the camera to prevent illegal images from reaching the plurality of applications.

18. The client-server architecture method of claim 1, wherein each of the connected devices further comprises at least one actuatable component,
wherein the plurality of applications generate actuator commands for the actuatable components in their corresponding connected devices, wherein the edge application translates each actuator command in accordance with an actuator command dictionary configured for each application-device pair comprising the application generating the actuator command and its corresponding connected device and transmits the translated actuator command to its respective connected device over the wireless communication system.

19. The client-server architecture method of claim 18, further comprising: communicatively connect the provided server computer with a database storing an inventory of portable electronic devices, the inventory comprising, for each portable electronic device, a device identification number and a corresponding list of authorized applications for that device, wherein, when an inventoried portable electronic device communicatively connects to the provided server computer, the provided server computer runs all of the applications authorized for that device in accordance with the inventory.

20. The client-server architecture method of claim 19, wherein the provided server computer continues to run all of the applications authorized for a portable electronic device included in the inventory after that device is no longer communicatively connected to the provided server computer, in order to resume the authorized applications quickly when that device reconnects to the provided server computer.

21. The client-server architecture method of claim 20, wherein the provided server computer is configured to selectively run each of the plurality of applications in active mode when data from the application is transmitted to its corresponding connected device, and in idle mode when data from the application is not transmitted to its corresponding connected device, wherein an application running in idle mode utilizes fewer server computer resources than in active mode.

22. A server computer for providing interactive dumb terminal applications through a wireless communication system to a plurality of portable electronic devices, comprising:
- a wireless transceiver operable to communicatively connect with a plurality of portable electronic devices over a wireless communication system;
- a processor connected to said wireless transceiver, running an operating system having a configured display timing parameter and running a plurality of device applications in parallel, each device application being run on behalf of a corresponding one of the connected devices, each device application being configured to generate output in accordance with the configured display timing parameter, wherein the processor continually monitors bandwidth of each communicative connection to each of the devices;
- a first non-transitory storage medium storing instructions that, when run by said processor cause said processor to run an edge application configured to select data from the device application outputs and to selectively transmit the selected data in a compressed format to respective ones of the connected devices over the wireless communication system, wherein a frequency of transmission to each device is dynamically throttled up or down by the edge application in accordance with changes in the monitored bandwidth of the communicative connection to that device.

23. The server computer of claim 22, wherein the outputs generated by the plurality of device applications are bitmaps, and wherein the edge application is configured to identify sponsored content in the bitmaps selected from the device application outputs and to selectively remove the identified sponsored content prior to selectively transmitting the selected bitmaps in a compressed format to respective ones of the connected devices.

24. The server computer of claim 23, wherein the edge application replaces the identified sponsored content with other content prior to selectively transmitting the selected bitmaps in a compressed format to respective ones of the connected devices.

25. The server computer of claim 24, wherein the plurality of device applications comprise multiple applications running on behalf of each of the connected devices, and wherein sponsored content identified in output from one application is replaced with output from another device application running on behalf of the same connected device.

26. The server computer of claim 22, wherein the plurality of device applications comprise multiple social media applications running on behalf of each of the connected devices, wherein the outputs generated by the social media applications are bitmaps, and wherein the edge application is configured to receive, from each connected device, respective search criteria, to identify content in the bitmap outputs from the social media applications running on behalf of each of the connected devices that match the search criteria received from that device, to selectively combine the identified content from the multiple social media applications into a bitmap for the corresponding device.

27. The server computer of claim 22, wherein the outputs generated by the plurality of device applications are bitmaps, and wherein the edge application is configured to perform optical character recognition (OCR) on the bitmaps selected from the application outputs.

28. The server computer of claim 22, wherein the configured operating system display timing parameter is less than or equal to half of a display timing for displays on each of the connected devices in order that the running device applications generate output at a rate that is at least twice a refresh rate of each of the connected device displays.

29. The server computer of claim 28, wherein the connected devices are electronic watches and mobile phones.

30. The server computer of claim 22, wherein the plurality of device applications comprise two or more applications running on behalf of a single one of the connected devices.

31. The server computer of claim 30, wherein the edge application combines outputs from the two or more device applications and transmits the combined output in a compressed format to the single one of the connected devices over the wireless communication system.

32. The server computer of claim 30, wherein the single one of the connected devices further comprises at least one sensor operable to generate input, and is further operable to transmit the generated input to the edge application over the wireless communication system,
- wherein the edge application selects one of the two or more device applications as an active application for the single one of the connected devices and transmits output data from the active application in a compressed format to the single one of the connected devices over the wireless communication system,
- and wherein, in response to certain input received from the single one of the connected devices the edge application selects a different one of the two or more device applications as the active application for the single one of the connected devices.

33. The server computer of claim 32, wherein the at least one sensor is a touchscreen and the certain input is a directional swipe gesture performed entirely inside an area of the touchscreen on which the active application is presented.

34. The server computer of claim 32, wherein the at least one sensor is a proximity sensor and the certain input is an in-air directional swipe gesture above and across the device display.

35. The server computer of claim 22, wherein each of the connected devices is operable to generate sensor input and to transmit the sensor input to the edge application over the wireless communication system,
- wherein the edge application directs the sensor input from each device to its corresponding device application.

36. The server computer of claim 35, wherein the edge application validates inputs received over the wireless communication system to prevent invalid and malicious input from reaching the plurality of device applications.

37. The server computer of claim 35, wherein the edge application translates the input from each device in accordance with a command dictionary configured for each application-device pair comprising the device that generated the input and the device application whose output was sent to that device.

38. The server computer of claim 35, wherein the at least one sensor is a camera, and wherein the edge application analyzes images captured by the camera to prevent illegal images from reaching the plurality of device applications.

39. The server computer of claim 22, wherein each of the connected devices further comprises at least one actuatable component,
- wherein the plurality of device applications generate actuator commands for the actuatable components in their corresponding connected devices, wherein the edge application translates each actuator command in accordance with an actuator command dictionary configured for each application-device pair comprising the device application generating the actuator command and its corresponding connected device and transmits the translated actuator command to its respective connected device over the wireless communication system.

40. The server computer of claim 39, further comprising:
a second non-transitory storage medium, connected to said processor, storing an inventory of portable electronic devices, the inventory comprising, for each portable electronic device, a device identification number and a corresponding list of authorized applications for that device, wherein, when an inventoried portable electronic device communicatively connects to said processor, said processor runs all of the applications authorized for that device in accordance with the inventory.

41. The server computer of claim 40, wherein said first non-transitory storage medium stores additional instructions that, when read by said processor, cause the edge application to run all of the applications authorized for a portable electronic device included in the inventory after that device is no longer communicatively connected to said processor, in order to resume the authorized applications quickly when that device reconnects to said processor.

42. The server computer of claim 41, wherein said first non-transitory storage medium stores additional instructions that, when read by said processor, cause the edge application to selectively run each of the plurality of device applications in active mode when data from the application is transmitted to its corresponding connected device, and in idle mode when data from the application is not transmitted to its corresponding connected device, wherein a device application running in idle mode utilizes fewer server computer resources than in active mode.

* * * * *